(12) United States Patent
Csendes et al.

(10) Patent No.: US 12,260,062 B1
(45) Date of Patent: Mar. 25, 2025

(54) DIGITAL MANIPULATION OF VIRTUAL USER INTERFACE VIA ACTIVATION OF INVISIBLE VIRTUAL WIDGET

(71) Applicant: Varjo Technologies Oy, Helsinki (FI)

(72) Inventors: Ábel Csendes, Helsinki (FI); Harri Wikberg, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/517,403

(22) Filed: Nov. 22, 2023

(51) Int. Cl.
*G06F 3/04815* (2022.01)
*G06F 3/01* (2006.01)
*G06F 3/0346* (2013.01)

(52) U.S. Cl.
CPC .......... *G06F 3/04815* (2013.01); *G06F 3/011* (2013.01); *G06F 3/0346* (2013.01)

(58) Field of Classification Search
CPC ... G06F 3/00; G06F 3/002; G06F 3/01; G06F 3/012; G06F 3/013; G06F 3/016; G06F 3/017; G06F 3/048; G06F 3/0481; G06F 3/04812; G06F 3/04815; G06F 3/04817; G06F 3/0482
USPC ........................................................ 345/7–9
See application file for complete search history.

(56) References Cited

U.S. PATENT DOCUMENTS

| | | | |
|---|---|---|---|
| 2013/0083024 A1* | 4/2013 | Li | H04N 13/183 345/426 |
| 2013/0335303 A1* | 12/2013 | Maciocci | G02B 27/017 345/8 |
| 2015/0020031 A1* | 1/2015 | El Dokor | G06F 3/04815 715/849 |
| 2016/0092050 A1* | 3/2016 | Dos Santos | G06F 3/0488 715/822 |
| 2018/0342103 A1* | 11/2018 | Schwarz | G06F 3/04845 |
| 2023/0140550 A1* | 5/2023 | Furtwangler | G06F 3/012 345/156 |
| 2023/0280866 A1* | 9/2023 | Kocienda | G06F 3/04815 |
| 2023/0400957 A1* | 12/2023 | Good | G06F 3/0487 |

* cited by examiner

*Primary Examiner* — Ke Xiao
*Assistant Examiner* — Nelson Lam
(74) *Attorney, Agent, or Firm* — Ziegler IP Law Group, LLC.

(57) ABSTRACT

Disclosed is a display apparatus and a method for digital manipulation of a virtual user interface in virtual environments. The display apparatus includes a light source, tracking means, and a processor configured to control the light source to project the virtual user interface, and process tracking data from the tracking means to detect the proximity of an interaction element, such as a user's hand, to an invisible segment of a virtual widget within the virtual user interface. Upon proximity detection, the light source is activated to display the virtual widget. The processor then determines if the segment has been activated and subsequently processes any positional changes of the interaction element to adjust the virtual user interface accordingly. This adjustment is performed in accordance with predefined visual effects that correspond to the activated segment, enabling intuitive and dynamic user interaction.

13 Claims, 13 Drawing Sheets

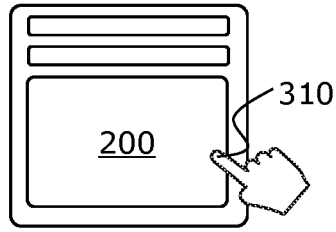 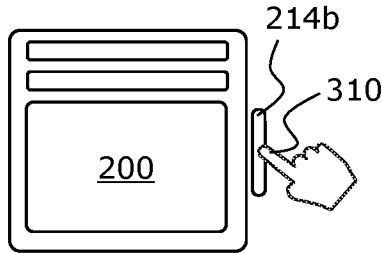 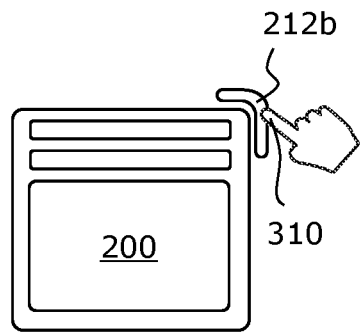
FIG. 4A     FIG. 4B     FIG. 4C
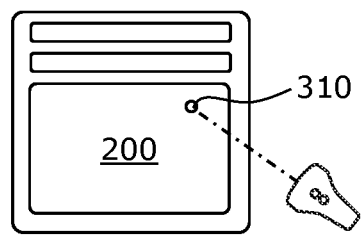 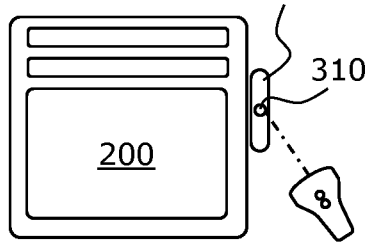 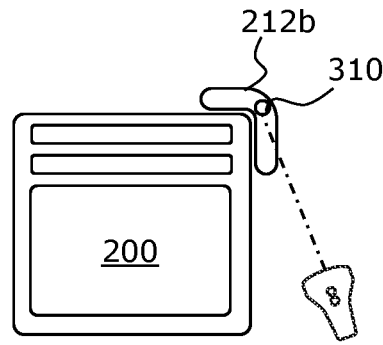
FIG. 5A     FIG. 5B     FIG. 5C

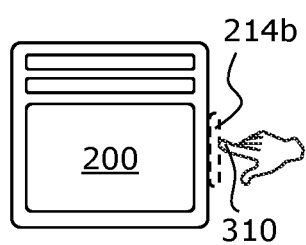 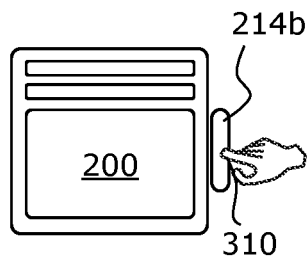 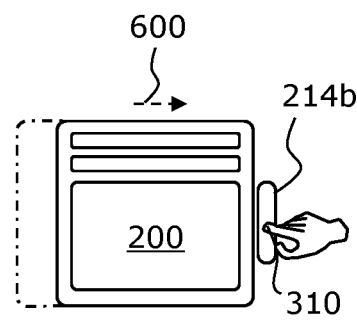
FIG. 6A　　　FIG. 6B　　　FIG. 6C
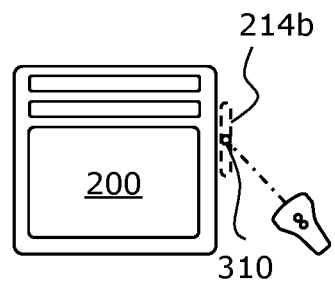 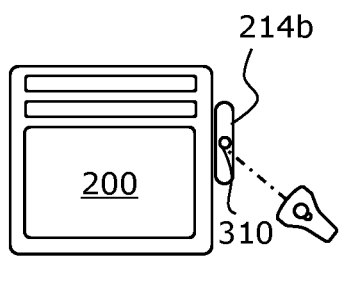 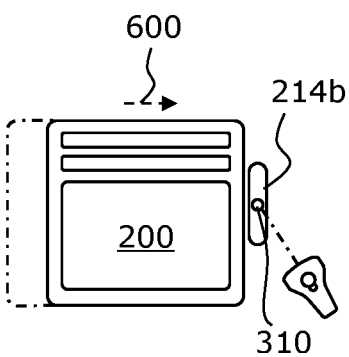
FIG. 7A　　　FIG. 7B　　　FIG. 7C

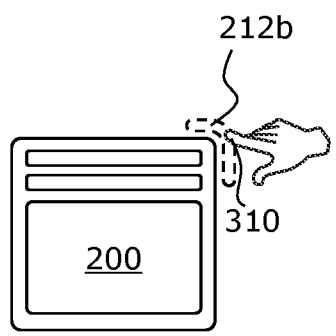 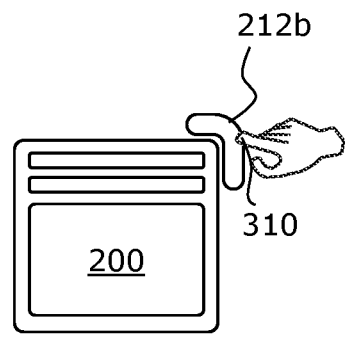 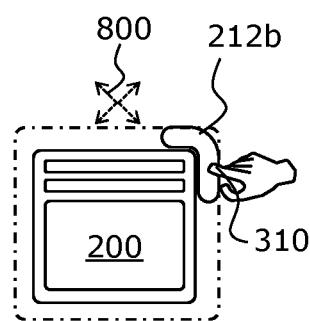
FIG. 8A          FIG. 8B          FIG. 8C
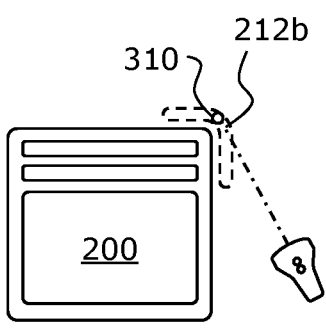 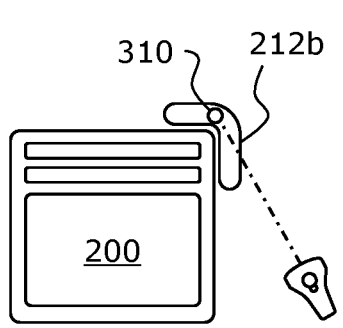 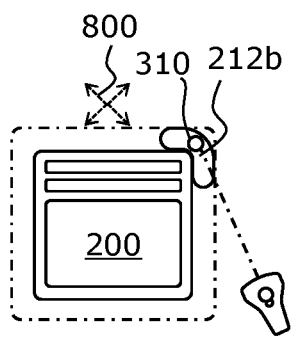
FIG. 9A          FIG. 9B          FIG. 9C

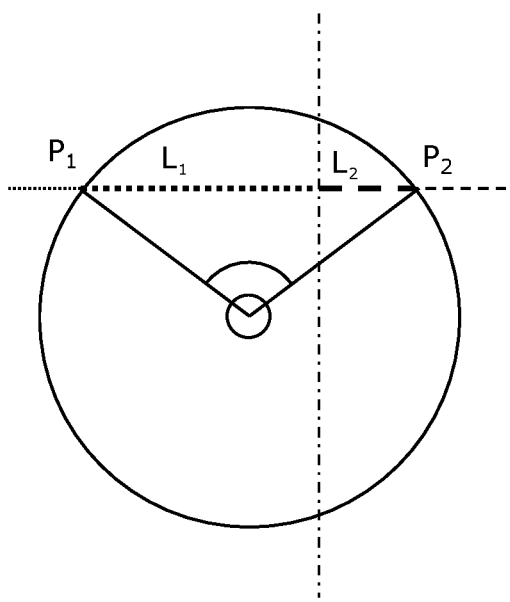
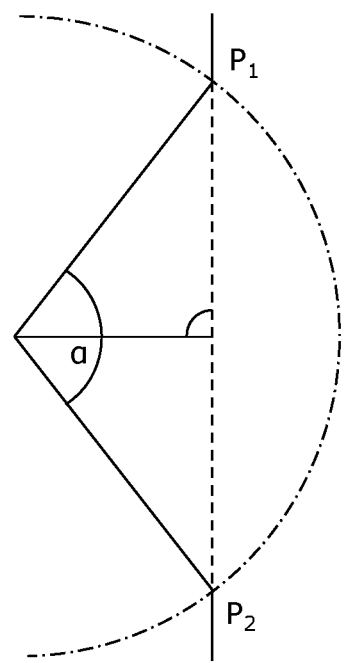
FIG. 11                    FIG. 12

DIGITAL MANIPULATION OF VIRTUAL USER INTERFACE VIA ACTIVATION OF INVISIBLE VIRTUAL WIDGET

TECHNICAL FIELD

The present disclosure relates to a display apparatus. Moreover, the present disclosure relates to a method for digital manipulation of virtual user interface.

BACKGROUND

In the evolving landscape of interactive technology, Extended Reality (XR) has emerged as frontier in user interface design. These interfaces exist in three-dimensional (3D) spaces and have revolutionized the way users interact with digital content. Unlike traditional two-dimensional interfaces confined to screens, 3D interfaces in XR provide a more immersive and realistic experience. They extend the user interaction from a flat surface to a spatial environment, offering a sense of depth and presence. With these advancements, user interfaces have evolved from static displays to dynamic environments where users can navigate and manipulate digital elements in a space that mimics the real world. The interfaces in these 3D environments are typically composed of panels, windows, and other elements that users can interact with, much like they would in a physical environment.

Despite the advancements in 3D interface technology, several challenges persist. One of the primary issues is the lack of intuitiveness in interacting with 3D user interface components. In 2D spaces, users have a direct and straightforward interaction model, usually point and click. However, in 3D spaces, the interaction becomes more complex due to the added dimension. Users often struggle to manipulate 3D interface elements with the same ease and precision they experience in 2D environments. Current solutions rely on static UI elements and UX patterns borrowed from 2D interfaces. These elements, including buttons and sliders, are placed in fixed locations on the panels and windows within the 3D space. This approach results in interactions that are less intuitive and more cumbersome in a 3D context. Users must adapt to the constraints of these static elements, which can be challenging and less efficient, especially when navigating through complex 3D environments.

Therefore, in the light of the foregoing discussion, there exists a need to overcome the aforementioned drawbacks.

SUMMARY

The aim of the present disclosure is to provide a display apparatus and a method for projecting a virtual user interface in a 3D space. The aim of the present disclosure is achieved by a display apparatus and a method for digital manipulation of virtual user interface, as defined in the appended independent claims, which involve controlling the light source to display the virtual user interface and to process tracking data to facilitate interaction with the virtual user interface, offering an immersive user experience. Advantageous features and additional implementations are set out in the appended dependent claims.

Embodiments of the present disclosure substantially eliminate or at least partially address the aforementioned problems in the prior art by integrating advanced light source control, sophisticated tracking mechanisms, and intelligent processor algorithms, and thereby providing a more intuitive, engaging, and versatile user interface.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 4A-4C are illustrations of an interaction element interfacing with the virtual user interface, with the interaction element being a finger of a user, in accordance with embodiments of the present disclosure;

FIGS. 5A-5C are illustrations of an interaction element interfacing with the virtual user interface, with the interaction element being a pointer of a user-interaction controller, in accordance with embodiments of the present disclosure;

FIGS. 6A-6C are illustrations of the virtual user interface being digitally manipulated via the interaction element in accordance with a movement effect associated with a given segment, with the interaction element being the finger of the user, in accordance with embodiments of the present disclosure;

FIGS. 7A-7C are illustrations of the virtual user interface being digitally manipulated via the interaction element in accordance with the movement effect associated with the given segment, with the interaction element being the pointer of the user-interaction controller, in accordance with embodiments of the present disclosure;

FIGS. 8A-8C are illustrations of the virtual user interface being digitally manipulated via the interaction element in accordance with a resizing effect associated with a given segment, with the interaction element being the finger of the user, in accordance with embodiments of the present disclosure;

FIGS. 9A-9C are illustrations of the virtual user interface being digitally manipulated via the interaction element in accordance with the resizing effect associated with the given segment, with the interaction element being the pointer of the user-interaction controller, in accordance with embodiments of the present disclosure;

FIG. 11 is an illustration for determining interaction lengths of two different segments within an interaction volume, in accordance with embodiments of the present disclosure;

FIG. 12 is an illustration for selection of a given segment on which both points of the interaction length lie, in accordance with embodiments of the present disclosure;

DETAILED DESCRIPTION OF EMBODIMENTS

Figure 1:
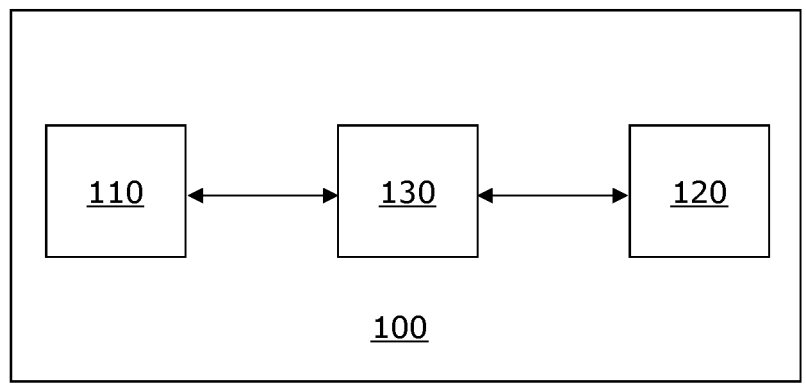
FIG. 1 is an illustration of a block diagram of a display apparatus, in accordance with embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a display apparatus comprising:
 at least one light source;
 at least one tracking means; and
 at least one processor configured to:
  control the at least one light source to display a virtual user interface in a three-dimensional space;
  process tracking data, collected by the at least one tracking means, to determine whether an interaction element is in proximity to a given segment of a virtual widget that is invisible in the three-dimensional space, wherein the virtual widget comprises at least a virtual border of the virtual user interface;
  when it is determined that the interaction element is in proximity to the given segment of the virtual widget, control the at least one light source to display the given segment in the three-dimensional space;
  determine whether the given segment is activated;
  when it is determined that the given segment is activated, process the tracking data to determine a change in the position of the interaction element upon said activation and digitally manipulate the virtual user interface according to a visual effect associated with the given segment and the change in the position of the interaction element.

In a second aspect, the present disclosure provides a method for digital manipulation of a virtual user interface, the method comprising:
 controlling at least one light source to display the virtual user interface in a three-dimensional space;
 processing tracking data, collected by at least one tracking means, to determine whether an interaction element is in proximity to a given segment of a virtual widget that is invisible in the three-dimensional space, wherein the virtual widget comprises at least a virtual border of the virtual user interface;
 when it is determined that the interaction element is in proximity to the given segment of the virtual widget, controlling the at least one light source to display the given segment in the three-dimensional space;
 determining whether the given segment is activated; and
 when it is determined that the given segment is activated, processing the tracking data to determine a change in the position of the interaction element upon said activation and digitally manipulate the virtual user interface according to a visual effect associated with the given segment and the change in the position of the interaction element.

The present disclosure provides the aforementioned display apparatus and the aforementioned method for digital manipulation of the virtual user interface. The light source, via the processor, is capable of projecting the virtual user interface, which is invisible in the three-dimensional (3D) space until the interaction element, such as a user's hand or a specialized pointer, comes into proximity with it. This reduces visual clutter in the user's environment, as the virtual interface elements are not constantly visible. The capability to detect proximity, using the tracking data, for activation allows for a more natural and intuitive engagement akin to real-world interactions. The virtual user interface is digitally manipulated according to the visual effect associated with the activated segment and the observed changes in position of the interaction element. This manipulation creates an immersive and engaging experience, as the interface responds in real-time to the user's actions, providing immediate and intuitive feedback that aligns with the user's expectations based on real-world interactions. Herein, the controlled display of interface elements by the light source, the precise tracking of the interaction element by the tracking means, and the intelligent processing result in a user interface experience that is not only intuitive and engaging but also more efficient and adaptable. This offers advantages over traditional 3D interfaces, particularly in terms of user engagement, accuracy of interaction, adaptability to various scenarios, and the reduction of visual and cognitive clutter.

Throughout the present disclosure, the term "display apparatus" refers to a specialized equipment that is capable of at least displaying a video stream. The video stream is to be presented to a user of the at least one display apparatus. It will be appreciated that the term "display apparatus" encompasses a head-mounted display (HMD) device and optionally, a computing device communicably coupled to the HMD device. The term "head-mounted display" device refers to specialized equipment that is configured to present an extended-reality (XR) environment to a user when said HMD device, in operation, is worn by said user on his/her head. The HMD device is implemented, for example, as an XR headset, a pair of XR glasses, and the like, that is operable to display a visual scene of the XR environment to the user. Examples of the computing device include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like.

Herein, the "at least one light source" (referred to as "light source") is utilized in the display apparatus for displaying the virtual user interface in the three-dimensional space. The light source is designed to project images and interface elements with precision and clarity. The light source may be configured to vary the intensity, color, and focus of the projected images, thereby enabling the display of the virtual user interface in various environmental conditions, including under different lighting conditions and onto different surfaces. The light source may also be configured to be responsive, allowing for real-time adjustments based on user interactions as detected by the tracking means and processed by the processor. The choice of the light source, whether it be laser-based for sharp, high-contrast images, or LED for a broader color gamut and energy efficiency, is determined based on the specific requirements of the intended application of the display apparatus.

Further, the "at least one tracking means" (referred to as "tracking means") is utilized in the display apparatus for the interactive capability therein. The tracking means is responsible for detecting the position, orientation, and movement of the interaction element, such as a user's hand or a specialized pointer (as discussed later), in relation to the virtual user interface. The tracking means employs advanced sensors and algorithms to ensure precise and real-time tracking. The tracking means can include, but is not limited to, optical sensors, infrared sensors, ultrasonic sensors, or a combination thereof, to cater to various tracking environments and requirements. The data collected by the tracking means is utilized by the processor to determine the proximity of the interaction element to specific segments of the virtual user interface and to process interaction-based commands.

The term "at least one processor" refers to a processor that is configured to control an overall operation of the display apparatus and to implement the processing steps. Examples of implementation of the at least one of processor may include, but are not limited to, a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry. The at least one of processor is communicably coupled to the light source and the tracking means.

The processor is configured to control the at least one light source to display the virtual user interface in the three-dimensional space. Herein, the processor controls the light source to project the virtual user interface within a pre-defined spatial area, as may be determined by intended application of the display apparatus. For this purpose, the processor operates the light source to establish a basic layout and structure of the virtual user interface. This includes the projection of key interface elements such as frames, borders, etc. that form visual elements of the virtual user interface. These elements are projected in a manner that optimizes visibility and orientation within the three-dimensional space, taking into account factors such as ambient light conditions, projection surfaces, and intended user perspectives. The light source may be adjusted to ensure that the virtual user interface is clearly visible and stable within the three-dimensional space. This involves controlling aspects such as brightness, contrast, and focus of the projected images, ensuring that they are clearly discernible in a variety of environments and viewing conditions.

The processor is, then, configured to process tracking data, collected by the at least one tracking means, to determine whether an interaction element is in proximity to a given segment of a virtual widget that is invisible in the three-dimensional space, wherein the virtual widget comprises at least a virtual border of the virtual user interface. Herein, the tracking means is responsible for continuously monitoring and capturing data regarding the position and movement of the interaction element within the three-dimensional space. The interaction element may be a user's hand, a controller, or even a stylus or any other designated object that is used to interact with the virtual user interface. The tracking means transmits this data, referred to as the "tracking data," to the processor. This tracking data may, then, be utilized, for instance, in determining the proximity of the interaction element to the given segment of the virtual widget within the virtual user interface, a segment that remains invisible in the three-dimensional space until certain interaction criteria are met.

Upon receiving the tracking data from the tracking means, the processor interprets this data. The processor is equipped with algorithms/modules configured to analyze the spatial relationship between the interaction element and the virtual user interface. Specifically, the processor determines whether the interaction element is within a certain proximity to a specific segment of the virtual widget. It may be appreciated that the determination of proximity may involve determining specific location of the interaction element relative to the invisible segments of the virtual widget in the three-dimensional space. This involves calculating distances and angles between the interaction element and the virtual widget, taking into consideration the three-dimensional nature of the space in which the virtual user interface exists.

It may be understood by a person skilled in the art that the tracking means, in operation, tracks a pose of an interaction element, the interaction element being one of: a hand of a user, a finger of the user, a user-interaction controller. Herein, the term "pose" encompasses both position and orientation. In the claim, only position was needed so only that has been mentioned to keep the wording broad. For instance, using the tracked pose of the hand, the pose of the finger could be determined (or the finger could be tracked separately explicitly).

In the present configuration, the virtual widget, forming a part of the virtual user interface, includes elements such as a virtual border or other interface components that are utilized for user interaction, such as resizing or movement of the virtual widget. Optionally, the virtual widget also comprises at least one virtual icon arranged in proximity of the virtual user interface. Optionally, the visual effect associated with a given virtual icon is one of: a brightness adjustment effect, a virtual user interface switching effect, a UI element manipulation effect. These virtual icons may be used for digitally manipulating the virtual user interface for additional visual effects besides resizing and movement. Examples of such additional visual effects may include, but not limited to, brightening the virtual user interface, dimming the virtual user interface, switching to a previous virtual user interface, switching to a next virtual user interface, addition of a UI element to the virtual user interface, removal of a UI element from the virtual user interface, and the like.

In embodiments of the present disclosure, the virtual widget remains invisible in the three-dimensional space until the processor detects the necessary proximity of the interaction element. The invisibility of the virtual widget in the three-dimensional space is a design choice, aimed at reducing visual clutter and enhancing the overall user experience. Herein, by analyzing the tracking data, the processor determines if the interaction element is close enough to a segment of the virtual widget to warrant its visibility. This proximity-based approach to displaying interface elements ensures that the virtual user interface remains unobtrusive until interaction is required.

When it is determined that the interaction element is in proximity to the given segment of the virtual widget, the processor is configured to control the at least one light source to display the given segment in the three-dimensional space. That is, after the processor processes the tracking data collected by the at least one tracking means and determines the proximity of the interaction element to the given segment of the virtual widget, a transition occurs in the operation of the display apparatus. This transition involves moving from a state where the virtual widget, or a segment thereof, remains invisible within the three-dimensional space, to a state where it becomes visible and interactive. Herein, upon determining the proximity of the interaction element to the given segment of the virtual widget, the processor sends specific commands to the light source to illuminate the given segment of the virtual widget that the interaction element is approaching or engaging with. It may be understood that the illumination of the given segment is a dynamic process, with the processor adjusting the intensity, color, and focus of the light emitted by the light source to optimize visibility and clarity for the user.

The given segment of the virtual widget, which may include elements such as the virtual border of the virtual user interface or other interface components, is thus selectively displayed in response to the user's interaction. This selective visibility enhances the user's focus and interaction by displaying only the relevant parts of the virtual user interface as needed. Furthermore, as the user interacts with the virtual user interface, the processor continually adjusts the display based on the changing position and movement of the interaction element. This adaptive display mechanism ensures that the user's experience is intuitive and seamless, with the virtual user interface responding dynamically to their actions within the three-dimensional space.

In an embodiment, the interaction element is a finger of a user, and wherein when processing the tracking data to determine whether the interaction element is in proximity to the given segment of the virtual widget, the at least one processor is configured to:

define a first origin point at a position of a tip of the finger, and an interaction volume around the first origin point, wherein the interaction volume is a spherical volume having a first radius;
   determine whether the interaction volume intersects with at least one segment of the virtual widget;
   when it is determined that the interaction volume intersects with the at least one segment of the virtual widget, identify a first point P1 and a second point of said intersection;
   determine whether the first point P1 and the second point lie on two different segments of the virtual widget,
   when it is determined that the first point P1 and the second point lie on the two different segments of the virtual widget, determine interaction lengths of the two different segments within the interaction volume, and select the given segment as that segment amongst the two different segments whose interaction length is higher than that of another segment amongst the two different segments;
   when it is determined that the first point P1 and the second point do not lie on the two different segments of the virtual widget, select the given segment as that segment on which both the first point P1 and the second point lie;
   determine a first perpendicular distance from the first origin point to the given segment; and
   determine whether the first perpendicular distance is less than or equal to a first predefined distance threshold, wherein it is determined that the finger is in proximity to the given segment of the virtual widget, when it is determined that the first perpendicular distance is less than or equal to the first predefined distance threshold.

In the present embodiment, considering the interaction element is the user's finger, the processor is configured to execute a series of steps to process tracking data for determining proximity to segments of the virtual widget. Initially, the processor defines a first origin point at the position of the tip of the finger and establishes an interaction volume around this first origin point. Upon defining the interaction volume, the processor then determines whether this interaction volume intersects with any segment of the virtual widget. This involves calculating the spatial relationship between the interaction volume around the finger's tip and the segments of the virtual widget within the three-dimensional space. The virtual widget, being a part of the virtual user interface, may consist of various interactive segments, and the intersection assessment is used to identify which segments are within the potential interaction range of the user's finger. When an intersection between the interaction volume and the virtual widget is established, the processor identifies a first point P1 and a second point of this intersection. These points mark the boundaries of the interaction between the finger's interaction volume and the virtual widget, and thus allow to determine the specific area of interaction (as required for subsequent processing stages). The processor then evaluates whether the first point P1 and the second point lie on two different segments of the virtual widget. If so, the processor calculates the interaction lengths of these two segments within the interaction volume. The segment with the higher interaction length is then selected as the given segment for further processing. This selection is based on the rationale that the segment with greater interaction length is likely the primary focus of the user's interaction intent. Conversely, if it is determined that the first point P1 and the second point do not lie on two different segments of the virtual widget, the processor selects the given segment as the one on which both points lie. This signifies that the user's interaction is concentrated on a single segment of the virtual widget, thus making it the primary focus of the user's interaction intent. Further, the processor determines a first perpendicular distance from the first origin point (the tip of the finger) to the given segment. This measurement is used for assessing the actual proximity of the user's finger to the segment of the virtual widget. The processor compares this distance with a first predefined distance threshold to decide whether the finger is in proximity to the given segment. The determination of proximity is finalized when the processor determines that the first perpendicular distance is less than or equal to the first predefined distance threshold. If this condition is met, it is concluded that the finger is in proximity to the given segment of the virtual widget.

In an exemplary embodiment, the interaction volume is a spherical volume having a first radius. Specifically, at the tip of the user's finger, which is tracked by the tracking means, the origin point is defined. Around this origin point, the spherical volume with the first radius is created, encapsulating a three-dimensional space. The volume of this sphere is calculated using the formula $V=(4/3)\pi r_1^3$, where 'n' represents the first radius of the spherical volume. Now, when the spherical volume, centered around the origin point at the tip of the user's finger, intersects with the invisible border of the virtual widget, two distinct points of intersection are formed on the surface of the spherical volume. These points are identified as the entry point and the exit point. Along with the origin point, these two points on the surface of the spherical volume are used to define the manner in which the virtual widget is displayed within the virtual user interface. The geometric relationship between these three points (the origin, entry, and exit) and the first radius of the spherical volume forms the basis for this definition. The spatial configuration of these points and the first radius create an isosceles triangle, with the two sides extending from the origin to the entry and exit points being of equal length, equal to the first radius of the spherical volume. The length of the virtual widget (L) is then calculated using the two known side lengths, which are equal to the first radius ($r_1$), and the angle ($\alpha$) they form, using the formula $L=2 \cdot r_1 \cdot \sin(\alpha/2)$, where '$\alpha$' is given by angle between the first radius between the first origin point and first point P1 of two points and the first radius between the first origin point and second point of two points. This method of defining the interaction with the virtual widget through geometric relationships enables precise control and responsiveness in the virtual user interface, ensuring an intuitive and accurate interaction experience for the user.

In another embodiment, the interaction element is a pointer of a user-interaction controller, and wherein when processing the tracking data to determine whether the interaction element is in proximity to the given segment of the virtual widget, the at least one processor is configured to:

define a second origin point at a position of an intersection point of the pointer with a plane in which the virtual user interface lies, and an interaction area around the second origin point;

determine whether the interaction area intersects with at least one segment of the virtual widget;

when it is determined that the interaction area intersects with the at least one segment of the virtual widget, identify a third point and a fourth point of said intersection;

determine whether the third point and the fourth point lie on two different segments of the virtual widget, when it is determined that the third point and the fourth point lie on the two different segments of the virtual widget, determine interaction lengths of the two different segments within the interaction area, and select the given segment as that segment amongst the two different segments whose interaction length is higher than that of another segment amongst the two different segments;

when it is determined that the third point and the fourth point do not lie on the two different segments of the virtual widget, select the given segment as that segment on which both the third point and the fourth point lie;

determine a second perpendicular distance from the second origin point to the given segment; and determine whether the second perpendicular distance is less than or equal to a first predefined distance threshold, wherein it is determined that the pointer is in proximity to the given segment of the virtual widget, when it is determined that the second perpendicular distance is less than or equal to the first predefined distance threshold.

In the present embodiment, considering the interaction element is the pointer of the user-interaction controller, initially, the processor defines the second origin point, which is determined at the position where the pointer intersects with the plane in which the virtual user interface lies. Around this second origin point, an interaction area is established. This interaction area represents a specific zone around the pointer's intersection point, within which the processor will assess potential interactions with the virtual user interface. The creation of this interaction area helps in defining the spatial relationship between the pointer and the virtual user interface, allowing the processor to effectively evaluate the pointer's interactions within the three-dimensional space. The processor then determines whether this interaction area intersects with any segment of the virtual widget. This step involves analyzing the spatial relationship between the interaction area and the segments of the virtual widget. The virtual widget, being a component of the virtual user interface, may include various segments that are designed for interaction. The intersection assessment allows to identify which segments of the virtual widget are within the potential interaction range of the pointer. When the processor establishes that the interaction area intersects with at least one segment of the virtual widget, it identifies two points of intersection: a third point and a fourth point. These points define the boundaries of the interaction between the interaction area of the pointer and the virtual widget, defining the specific area of interaction within the virtual user interface. Subsequently, the processor determines whether the third point and the fourth point lie on two different segments of the virtual widget. If this is the case, the processor calculates the interaction lengths of these two segments within the interaction area. The processor then selects the given segment from these two segments as the one with the higher interaction length, based on the rationale that the segment with a greater interaction length is likely the primary focus of the user's interaction intent. Conversely, if the third point and the fourth point are found to lie on the same segment of the virtual widget, the processor selects this segment as the given segment for further interaction. This indicates that the user's interaction is concentrated on a single segment of the virtual widget. The processor further determines a second perpendicular distance from the second origin point to the given segment. This measurement is used in assessing the actual proximity of the pointer to the segment of the virtual widget. The processor compares this distance with the first predefined distance threshold to decide whether the pointer is in proximity to the given segment. The determination of proximity is finalized when the processor determines that the second perpendicular distance is less than or equal to the first predefined distance threshold. If this condition is met, the processor concludes that the pointer is in proximity to the given segment of the virtual widget, enabling subsequent interactive functionalities of the display apparatus.

In an exemplary embodiment, the interaction area is a circular area having a second radius. Unlike the method involving a user's finger where a three-dimensional volume is used, here the interaction area is confined to a two-dimensional plane, coinciding with the plane of panel of the virtual user interface. The pointer of the user-interaction controller is represented as an infinitely long line, and the point at which this line intersects the plane of the panel is designated as the origin point for the interaction area. Around this origin point, the circular area is defined, calculated using the formula $A=\pi \cdot r_2^2$, where '$r_2$' represents the second radius of the circular area. Now, when the circular area intersects with the invisible border of the virtual widget, two points of intersection are formed on the circumference of the circular area. These points are identified as the entry point and the exit point of the interaction. In conjunction with the origin point, these two points of intersection are used to define the parameters for displaying the virtual widget. The geometric configuration of these three points, the origin, entry, and exit, along with the known second radius of the circular area, enables the precise determination of the display parameters of the virtual widget. The spatial arrangement of these points forms an isosceles triangle, with the two sides extending from the origin to the entry and exit points being of equal length, equal to the second radius of the circular area. The length of the virtual widget (L) is then calculated using the two known side lengths and the angle (α) they form, using the formula $L=2 \cdot r_2 \cdot \sin(\alpha/2)$, allowing for a geometrically defined display of the virtual widget. Optionally, the first predefined distance threshold is equal to two-times the second radius, if the interaction element is the pointer of the user-interaction controller. This method of defining the interaction with the virtual widget through geometric relationships s enables precise control and responsiveness in the virtual user interface, ensuring an intuitive and accurate interaction experience for the user.

The processor is further configured to determine whether the given segment is activated. This determination is based on the analysis of the tracking data collected by the at least one tracking means. In particular, the activation of the given segment is based upon specific interactions by the user, as detected by the tracking means. The tracking means captures data related to the position and movement of the interaction element, such as a user's hand or a controller, in proximity to the virtual widget. Upon receiving this tracking data, the processor analyzes it to determine whether the conditions for activation of the given segment of the virtual widget have been met. This analysis involves assessing whether the interaction element has engaged with the segment in a manner that signifies activation. For instance, the processor evaluates whether the interaction element, like a user's hand or the user-interaction controller's pointer, has performed an action (such as a specific gesture or button press) that aligns with the predefined activation criteria for the virtual widget.

In an embodiment, when determining whether the given segment is activated, the at least one processor is configured to:
  define a third origin point at a position of a tip of another finger of the user;
  determine a distance between the first origin point and the third origin point, wherein the given segment is determined to be activated when said distance is less than or equal to a second predefined distance threshold.

That is, for the exemplary embodiment of the interaction element being the user's finger, initially, the processor defines the third origin point, which is located at the position of the tip of another finger of the user. This third origin point is established in addition to the first origin point, which has already been determined at the tip of one of the user's fingers. The introduction of this third origin point facilitates an interaction mechanism, where multiple points of reference (i.e., the tips of different fingers) are used to interpret the user's interaction with the virtual user interface. Once the third origin point is established, the processor proceeds to determine the distance between the first origin point and the third origin point. This step involves calculating the spatial distance between the tips of the two fingers of the user. The given segment of the virtual widget is determined to be activated when the calculated distance between the first origin point and the third origin point is less than or equal to the second predefined distance threshold. In a non-limiting example, the second predefined distance is equal to the first radius, where the first radius is previously defined as the radius of the spherical volume around the first origin point, which is the tip of one of the user's fingers. In practical terms, this means that when the user brings another finger (associated with the third origin point) within a distance from the first finger (associated with the first origin point) that is equal to or less than the radius of the spherical interaction volume, the given segment of the virtual widget is activated. This setup effectively utilizes the first radius as a standard measure for both defining the interaction volume and determining the activation of the virtual widget segments.

In an implementation, the processor is configured to track both the user's finger (being used as the interaction element) and a thumb of the user's hand, focusing on a distance between the first origin point (at the tip of the user's finger) and the third origin point (at the tip of the thumb). This distance, referred to as $D_{finger}$, may be calculated to assess whether the user has performed an action that signifies an intent to activate the virtual widget. Activation of the given segment is contingent upon $D_{finger}$ being less than or equal to the first radius of the interaction volume around tip of the user's finger. If $D_{finger}$ is greater than this first radius, the processor interprets this as a lack of activation, meaning the user has not performed the necessary action to activate the virtual widget. However, if $D_{finger}$ is less than or equal to the first radius, this indicates that the user's thumb and the user's finger have come into sufficient proximity to each other, and the virtual widget is activated. Further, to cancel or stop this activation, the user may simply move their thumb and the user's finger further away from each other, increasing $D_{finger}$ beyond the first radius of the interaction volume. This action is detected by the processor, which then responds by terminating the activation state of the virtual widget.

In an embodiment, when determining whether the given segment is activated, the at least one processor is configured to:
  receive, from the user-interaction controller, a user input provided by a user; and
  process the user input to determine whether the user input is indicative of activation of the given segment.

That is, for the exemplary embodiment of the interaction element being the user-interaction controller, initially, the processor receives user input provided by a user through the user-interaction controller. The user-interaction controller, as part of the display apparatus, may be configured to capture various forms of user inputs, such as button presses, joystick movements, touchpad interactions, or other control manipulations. The user input is then transmitted to the processor. Upon receiving the user input, the processor analyzes the nature, intensity, duration, and other characteristics of the user input to determine whether it aligns with the predefined criteria for activating a given segment of the virtual widget. For instance, a specific button press may be programmed to correspond to the activation of the given segment of the virtual widget. The processor interprets such user input, comparing it against the set activation parameters. If the user input matches the criteria for activation, the processor then initiates the appropriate response within the display apparatus.

In an implementation, the processor is configured to receive specific user input, which may be provided via a designated button or trigger on the user-interaction controller. The activation process is initiated based on this user interaction. This direct mapping ensures that the user's intent is efficiently communicated to the display apparatus, facilitating a quick and responsive interaction. To cancel or stop the activation, the user can simply release the button or trigger on the user-interaction controller. This release is detected by the processor, which then processes this change in the user input to terminate the activation of the virtual widget.

When it is determined that the given segment is activated, the processor is further configured to process the tracking data to determine a change in the position of the interaction element upon said activation and digitally manipulate the virtual user interface according to a visual effect associated with the given segment and the change in the position of the interaction element. That is, once the processor has determined that the given segment of the virtual widget is activated, the process involves processing the tracking data to determine any change in the position of the interaction element following the activation, and then using this information to digitally manipulate the virtual user interface. This manipulation is executed in accordance with a visual effect that is specifically associated with the activated segment and the observed positional change of the interaction element.

Specifically, upon the activation of the given segment, the processor begins to process the tracking data received from the tracking means. This data includes information about the position and movement of the interaction element, which can be a user's finger, a pointer, or any other designated object for interaction. The processor analyzes this data to detect any changes in the position of the interaction element from the moment of activation. The processor then proceeds to digitally manipulate the virtual user interface corresponding to the specific visual effect that is associated with the given segment of the virtual widget. The nature of the visual effect is pre-defined and is designed to enhance the user's interaction experience with the virtual user interface. For example, the visual effect may include changes in size, shape, or the appearance of new graphical elements in response to the user's interaction. This dynamic response of the virtual user interface to the user's actions serves to make the interaction more engaging and intuitive.

In one example, the interaction element, following its activation of a given segment, moves from a position proximal to that segment to a new point in the three-dimensional space, which is located away from the virtual user interface. In response to this movement, the processor applies the visual effect to the virtual user interface, such as moving the entire virtual user interface to align with the new point of the interaction element or resizing the virtual user interface to extend up to this new point. Such manipulation ensures that the virtual user interface is responsive to the user's actions.

In another example, the interaction element moves closer to the given segment after its activation. In this case, the processor waits until the interaction element moves to a new point following such activation, which is distinct from the original activation point and located in the three-dimensional space away from the virtual user interface. Once the interaction element reaches this new point, the processor then applies the appropriate visual effect. Such manipulation ensures that the virtual user interface remains static during the initial approach but adapts dynamically to subsequent movements of the interaction element.

In yet another example, the interaction element moves along the virtual border of the virtual user interface after activating the given segment, and comes into proximity with another segment of the virtual widget. Herein, the processor activates the other segment but waits until the interaction element moves to another new point in the three-dimensional space, away from the virtual user interface, before applying the visual effect. Such manipulation ensures that the virtual user interface responds in a controlled manner to a trail of the interaction element along its border.

In an embodiment, when it is determined that the given segment is activated, the at least one processor is further configured to control the at least one light source to display a visual cue indicative of said activation, in the three-dimensional space, wherein upon displaying of the visual cue, the position of the interaction element is changeable for digitally manipulating the virtual user interface according to the visual effect associated with the given segment. That is, upon the activation of the given segment, the processor communicates with the light source to project the visual cue in the three-dimensional space, closely associated with the activated segment of the virtual user interface. This visual cue serves as an indicator of activation for the user, enhancing the interactive experience by providing clear feedback on their actions. The nature of this visual cue can vary depending on the design and functionality of the virtual user interface, and may include changes in color, brightness, or the appearance of the graphical indicators near or around the activated segment. Following the display of the visual cue, the position of the interaction element, such as the user's finger or a controller's pointer, becomes changeable. The processor is configured to track the changes in the position of the interaction element and process them to digitally manipulate the virtual user interface accordingly. As discussed, the digital manipulation of the virtual user interface is based on the visual effect associated with the activated segment. This ability of the processor to control the light source to display the visual cue upon activation, followed by its capability to digitally manipulate the virtual user interface based on the subsequent movements of the interaction element, ensures a highly responsive and user-centric interface by providing real-time visual feedback to the user.

In an embodiment, the visual effect associated with the given segment of the virtual widget comprises one of: a resizing effect, a movement effect. That is, the visual effect associated with the activation of the given segment of the virtual widget is characterized by specific types of responses, such as, but not limited to, either the resizing effect or the movement effect. These effects are executed by the processor and are displayed via the light source. Herein, when the visual effect associated with the activated segment is the resizing effect, the virtual user interface undergoes a change in size or scale in response to the user's interaction. For instance, if the user's interaction suggests an intent to enlarge or shrink a particular segment, the processor may expand the segment to offer a more detailed view or compress it to minimize its presence within the virtual user interface. In case the visual effect is the movement effect, the segment of the virtual widget is repositioned within the three-dimensional space following the activation. This movement can be along any axis in the 3D space and is directly correlated to the user's interaction, such as directing the segment to a different location within the virtual user interface.

Herein, the interaction with the virtual user interface, specifically moving and scaling the panel of the virtual user interface using the virtual widget, is facilitated through both user's finger tracking and the user-interaction controller. For moving the panel, the initial step involves the user positioning their finger or the user-interaction controller in close proximity to a side of the panel. Once the user's finger or the pointer of the user-interaction controller is near the side of the panel, the processor presents and activates the virtual widget, and then allows the user to freely move the panel within the virtual user interface. The processor tracks the movement of the user's finger or the user-interaction controller and correspondingly adjusts the position of the panel in real-time. For scaling the panel, the process begins with the user placing their pointer finger or the user-interaction controller near a corner of the panel. Following this, the user presents and activates the virtual widget. In hand tracking, the required thumb motion is employed for activation, while in the controller scenario, the user presses the relevant button or trigger. Once activated, the user is then able to freely scale the panel. In hand tracking, this is done by moving the pointer finger, and with the controller, by manipulating the controller itself. The processor responds to these movements by dynamically adjusting the size of the panel within the virtual user interface.

In an embodiment, the virtual widget is divided into a plurality of segments such that at least one first segment amongst the plurality of segments is associated with a different visual effect than at least one second segment amongst the plurality of segments. Herein, the first segment, which may be positioned along the periphery or any designated area of the virtual user interface, may be programmed to provide a specific visual response when activated or interacted with. For instance, this first segment may trigger a resizing effect, altering the scale of the user interface in accordance with the user's gestures or controller inputs. Upon activation, this movement effect may be used to reposition the virtual user interface within the three-dimensional space, corresponding to the direction and extent of the user's movement. Such association of each segment with a unique visual effect not only enhances the user experience by providing a diverse range of interactions but also increases the functionality of the virtual user interface. This configuration allows users to execute complex commands and manipulate the virtual environment with precision and ease.

In an embodiment, the plurality of segments comprise eight segments such that four first segments amongst the eight segments are arranged at four corners of the virtual user interface, and four second segments amongst the eight segments are arranged at four sides of the virtual user interface. That is, the virtual user interface is segmented into eight distinct segments, enhancing the specificity and range of user interactions. Among these eight segments, the four first segments are positioned at the four corners of the virtual user interface. In an implementation, the four first segments (corner segments) are typically associated with specific visual effects that are suitable for actions such as resizing, or rotating, the virtual user interface. For instance, a user may direct a pointer to one of the corner segments to initiate a diagonal expansion or contraction of the interface, invoking a visual effect consistent with corner interactions. The four second segments are located along the four sides of the virtual user interface. In an implementation, the four second segments (side segments) may facilitate linear movement, or even scrolling actions. For instance, interacting with a side segment may enable the user to slide the panel laterally or vertically within the three-dimensional space. This arrangement allows users to intuitively manipulate the virtual user interface by interacting with the sides or corners, depending on the desired action. It may be noted that, in alternate implementations, the four first segments may be associated with the movement effect and the four second segments may be associated with the resizing effect, without departing from the spirit and the scope of the present disclosure.

In an embodiment, a length of each segment amongst the plurality of segments depends on:
dimensions of the virtual user interface; and
dimension that is to be used for defining an interaction volume or an interaction area of the interaction element when processing the tracking data to determine whether the interaction element is in proximity to the given segment of the virtual widget.

Herein, the length of each segment is based on the overall dimensions of the virtual user interface and the particular dimension that is designated for defining the interaction volume or the interaction area (as discussed in the preceding paragraphs) of the interaction element. In particular, a height, a width, and a depth of the virtual user interface directly influence the proportional scaling of each segment, ensuring that the segments are appropriately sized relative to the entire interface. This proportional relationship ensures that the segments are neither too large, which could lead to inaccurate interactions, nor too small, which may make it difficult to interact with accurately. Further, the dimensions used for defining the interaction volume or the interaction area, specifically the spatial parameters established around the interaction element, such as the user's finger or the pointer from the user-interaction controller, are also used in determining the length of each segment. For instance, if the interaction volume is the spherical volume around the tip of the user's finger, its radius (first radius) may be considered as the dimension for determining the length of the segments. Similarly, if the interaction area is a circular area around a pointer's contact point on a two-dimensional plane, its radius (second radius) may be considered as the dimension for determining the length of the segments.

In an implementation, the length of the virtual widget is directly influenced by the size of the area defined around the interaction element. The maximum length ($L_{max}$) that the virtual widget can extend to is determined by this defined space, specifically being twice the radius of the area surrounding the interaction element. This radius may be used for calculating both the maximum extension of the virtual widget and the minimum engagement necessary for its display. Specifically, the display of the virtual widget is conditional upon the distance between the origin point of the interaction element and the invisible border of the panel of the virtual user interface. Further, if this distance (D) exceeds the radius of the defined area around the interaction element ($D_{max}$), the display of the virtual widget is not initiated, keeping it invisible until user interaction is detected within the appropriate range. This mechanism ensures that the virtual widget appears only when the user intends to interact with the virtual user interface.

Further, in an implementation, in the case of the virtual widget being located covering both one of the corner and one of the sides of the virtual user interface, the length of the involved sections would determine the function of the visual effect. In particular, if the length of the side (move section) is greater than the length of the corner (scale section), the processor interprets the user's action as an intent to move the panel. Consequently, the processor initiates the movement effect, causing the virtual user interface panel to reposition within the three-dimensional space in response to the user's input. Conversely, if the length of the corner is greater than the length of the side, the processor interprets the user's action as an intent to resize the panel. Consequently, the processor initiates the resizing effect, adjusting the size of the virtual user interface panel in response to the user's input.

The present disclosure also relates to the second aspect as described above. Various embodiments and variants disclosed above, with respect to the aforementioned first aspect apply mutatis mutandis to the second aspect.

The method for the digital manipulation of a virtual user interface, as per the second aspect, includes a sequence of operations that enhance the interactive experience within the three-dimensional space. The method begins with the control of at least one light source to project the virtual user interface. The method continues with the processing of tracking data, which is collected by the tracking means. The tracking data is used for determining the spatial relationship between the interaction element, such as a user's hand or a controller's pointer, and the virtual widget, which remains invisible in the three-dimensional space until required for interaction. Herein, the virtual widget includes, at minimum, a virtual border of the virtual user interface, which serves as the interactive threshold for the user. Upon establishing that the interaction element is within proximity to the given segment of the virtual widget, the method involves controlling the light source to display that segment. The subsequent step involves determining whether the given segment has been activated by the interaction element. Activation may be indicated by a variety of gestures or controller inputs, as defined by the system's interaction parameters. Upon activation, the method proceeds to process further tracking data to identify any change in the position of the interaction element. Finally, when activation is confirmed, the method includes digitally manipulating the virtual user interface in response to the change in the position of the interaction element.

The present method provides a responsive, user-centric interface that dynamically adapts to the user's presence and intent within the three-dimensional space. Unlike traditional static user interfaces, the method allows for the virtual user interface to remain invisible, reducing visual clutter and enhancing the user's focus on relevant interactions. The conditional display of elements of the virtual user interface based on proximity and the responsive visual effects upon activation provide a more intuitive and engaging user experience.

In an embodiment, the interaction element is a finger of a user, and wherein for processing the tracking data to determine whether the interaction element is in proximity to the given segment of the virtual widget, the method further comprises:
- defining a first origin point at a position of a tip of the finger, and an interaction volume around the first origin point;
- determining whether the interaction volume intersects with at least one segment of the virtual widget;
- when it is determined that the interaction volume intersects with the at least one segment of the virtual widget, identifying a first point P1 and a second point of said intersection;
- determining whether the first point P1 and the second point lie on two different segments of the virtual widget,
- when it is determined that the first point P1 and the second point lie on the two different segments of the virtual widget, determining interaction lengths of the two different segments within the interaction volume, and select the given segment as that segment amongst the two different segments whose interaction length is higher than that of another segment amongst the two different segments;
- when it is determined that the first point P1 and the second point do not lie on the two different segments of the virtual widget, selecting the given segment as that segment on which both the first point P1 and the second point lie;
- determining a first perpendicular distance from the first origin point to the given segment; and
- determining whether the first perpendicular distance is less than or equal to a first predefined distance threshold, wherein it is determined that the finger is in proximity to the given segment of the virtual widget, when it is determined that the first perpendicular distance is less than or equal to the first predefined distance threshold.

By defining the interaction volume based on the position of the user's finger, the method allows for detection of finger proximity to the virtual user interface, and by determining the intersection points within this interaction volume and calculating the lengths for various segments, the method enhances precision in digital manipulation of the virtual user interface. This enables a more natural and intuitive interaction, closely mimicking real-world object handling, thus greatly improving the user's experience with the virtual interface.

In an embodiment, when determining whether the given segment is activated, the method further comprises:
- defining a third origin point at a position of a tip of another finger of the user;
- determining a distance between the first origin point and the third origin point, wherein the given segment is determined to be activated when said distance is less than or equal to a second predefined distance threshold.

Thereby, the method refines the interaction process by utilizing the spatial relationship between two fingers to activate the segment of the virtual widget. This streamlines the interaction, simplifying the user's interaction with the virtual interface.

In an embodiment, the interaction element is a pointer of a user-interaction controller, and wherein for processing the tracking data to determine whether the interaction element is in proximity to the given segment of the virtual widget, the method further comprises:
- defining a second origin point at a position of an intersection point of the pointer with a plane in which the virtual user interface lies, and an interaction area around the second origin point;
- determining whether the interaction area intersects with at least one segment of the virtual widget;
- when it is determined that the interaction area intersects with the at least one segment of the virtual widget, identifying a third point and a fourth point of said intersection;
- determining whether the third point and the fourth point lie on two different segments of the virtual widget,
- when it is determined that the third point and the fourth point lie on the two different segments of the virtual widget, determining interaction lengths of the two different segments within the interaction volume, and select the given segment as that segment amongst the two different segments whose interaction length is higher than that of another segment amongst the two different segments;
- when it is determined that the third point and the fourth point do not lie on the two different segments of the virtual widget, selecting the given segment as that segment on which both the third point and the fourth point lie;
- determining a second perpendicular distance from the second origin point to the given segment; and
- determining whether the second perpendicular distance is less than or equal to a first predefined distance threshold, wherein it is determined that the pointer is in proximity to the given segment of the virtual widget, when it is determined that the second perpendicular distance is less than or equal to the first predefined distance threshold.

Thereby, the method enhances the interaction with the virtual user interface using the pointer from the user-interaction controller by defining the two-dimensional interaction area on the same plane as the interface. This approach allows for a more straightforward and accurate interaction. By identifying the intersection points within this area and evaluating their positions relative to different segments, the method enables precise control over the virtual user interface, thereby improving the user interactions.

In an embodiment, when determining whether the given segment is activated, the method further comprises:
  receiving, from the user-interaction controller, a user input provided by a user; and
  processing the user input to determine whether the user input is indicative of activation of the given segment.

Thereby, the method improves the user's interaction with the virtual user interface by directly translating user input from the user-interaction controller into action commands for the virtual widget. By processing user inputs, such as button presses or trigger pulls, the method offers simple process for activating segments of the virtual user interface. This streamlines user interactions, providing a more responsive and user-friendly experience.

The display apparatus and the method of the present disclosure offer a framework for enhancing user interaction within a three-dimensional virtual environment. Utilizing at least one light source controlled by at least one processor, the display apparatus can display the virtual user interface that is dynamically responsive to the proximity and activation by the interaction element such as the user's finger or the controller's pointer. This approach enables precise manipulation of virtual widgets, which are segmented to provide distinct visual effects like resizing or movement, thereby facilitating a range of applications from immersive gaming to detailed virtual modeling. In particular, the proposed approach significantly reduces visual clutter by selectively displaying segments of the virtual widget only when interaction is detected, thereby maintaining a clean and unobtrusive user interface. This focused visibility not only streamlines the user experience but also enhances the interface's intuitiveness and efficiency in various applications. The display apparatus and the method of the present disclosure are particularly useful in educational and design use-cases, as users would be able to engage with complex virtual objects and interfaces in an intuitive manner due to the enhanced user experience.

DETAILED DESCRIPTION OF THE DRAWINGS

Referring to FIG. 1, illustrated is a schematic block diagram of a display apparatus 100, in accordance with embodiments of the present disclosure. The display apparatus 100 includes at least one light source 110. The display apparatus 100 also includes at least one tracking means 120. The display apparatus 100 further includes at least one processor 130.

Figure 2:
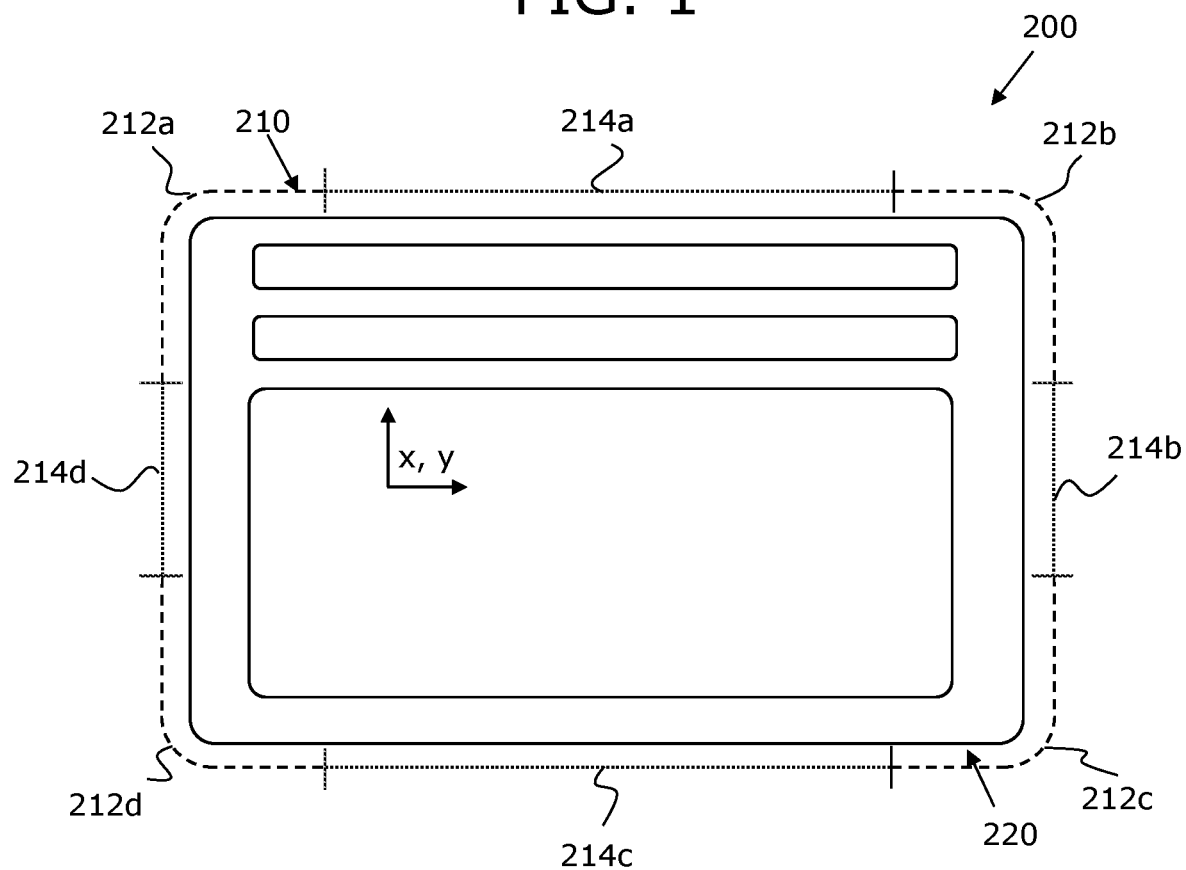
FIG. 2 is an illustration of a virtual user interface, in accordance with embodiments of the present disclosure.

Referring to FIG. 2, illustrated is an exemplary depiction of a virtual user interface 200, in accordance with embodiments of the present disclosure. As illustrated, the virtual user interface 200 includes a virtual widget 210 and a virtual border 220, such that the virtual widget 210 includes at least the virtual border 220 of the virtual user interface 200. Herein, the virtual widget 210 is divided into a plurality of segments 212a-d and 214a-d. Specifically, the plurality of segments 212a-d, 214a-d comprise eight segments such that four first segments 212a-d amongst the eight segments are arranged at four corners of the virtual user interface 200, and four second segments 214a-d amongst the eight segments are arranged at four sides of the virtual user interface 200.

Figure 3A:
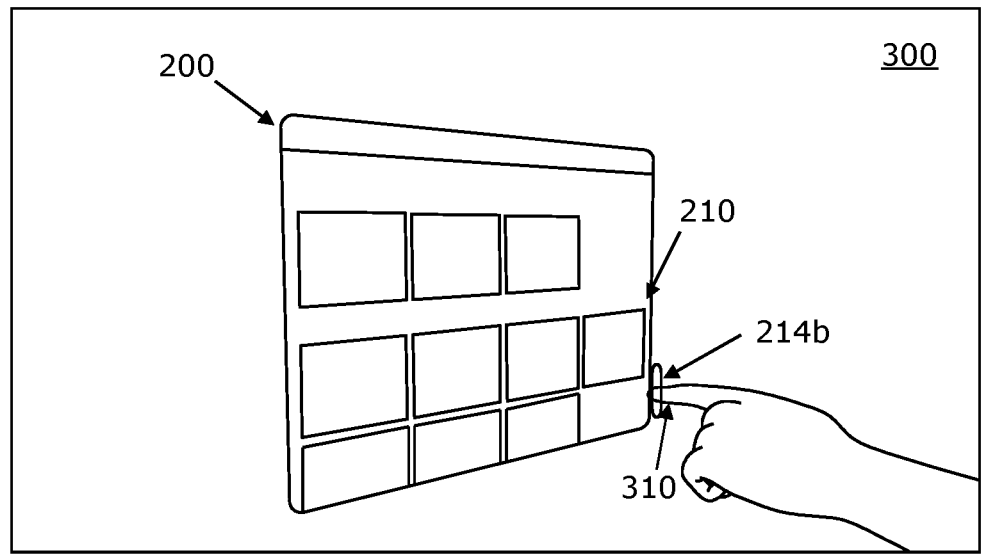
FIGS. 3A and 3B are illustrations of the virtual user interface in a three-dimensional space, in accordance with embodiments of the present disclosure.
Figure 3B:
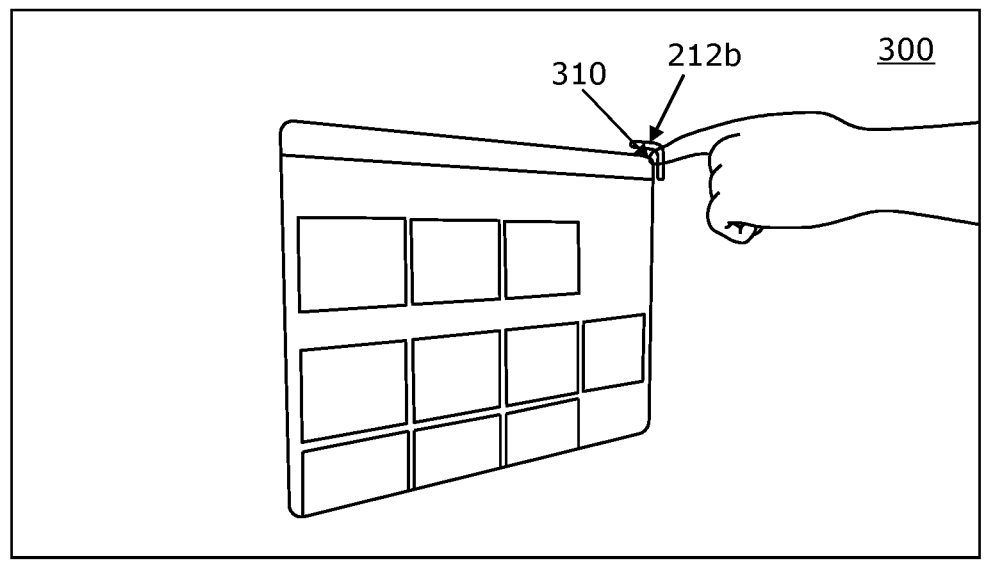

Referring to FIGS. 3A and 3B, illustrated are exemplary depictions of the virtual user interface 200 in a three-dimensional space 300, in accordance with embodiments of the present disclosure. As illustrated, herein, an interaction element 310 is interacting with a given segment 212b, 214b of the virtual widget 210 of the virtual user interface 200. In the illustrated examples, the interaction element 310 is a finger of a user. In other examples, the interaction element 310 may be a pointer of a user-interaction controller (as discussed later).

Referring to FIGS. 1, 2 and 3A-3B, in combination, in the display apparatus 100, the at least one processor 130 is configured to control the at least one light source 110 to display the virtual user interface 200 in the three-dimensional space 300. The at least one processor 130 is further configured to process tracking data, collected by the at least one tracking means 120, to determine whether the interaction element 310 is in proximity to a given segment 212b, 214b of the virtual widget 210 that is invisible in the three-dimensional space 300, wherein the virtual widget 210 comprises at least the virtual border 220 of the virtual user interface 200. When it is determined that the interaction element 310 is in proximity to the given segment 212b, 214b of the virtual widget 210, the at least one processor 130 is configured to control the at least one light source 110 to display the given segment 212b, 214b in the three-dimensional space 300. The at least one processor 130 is further configured to determine whether the given segment 212b, 214b is activated. When it is determined that the given segment 212b, 214b is activated, the at least one processor 130 is configured to process the tracking data to determine a change in the position of the interaction element 310 upon said activation and digitally manipulate the virtual user interface 200 according to a visual effect associated with the given segment 212b, 214b and the change in the position of the interaction element 310. Herein, at least one first segment amongst the plurality of segments 212a-d, 214a-d is associated with a different visual effect than at least one second segment amongst the plurality of segments 212a-d, 214a-d. The visual effect associated with the given segment of the virtual widget 210 comprises one of: a resizing effect, a movement effect.

Referring to FIGS. 4A-4C, illustrated are different depictions of the interaction element 310 interfacing with the virtual user interface 200, in accordance with embodiments of the present disclosure. In the illustrated examples, the interaction element 310 is a finger of a user. As illustrated in FIG. 4A, the interaction element 310 approaches the virtual user interface 200, which remains uncluttered until interaction is imminent. As illustrated in FIG. 4B, the interaction element 310 is depicted as having made contact with a given segment 214b of the virtual user interface 200, at which point the at least one processor 130 controls the at least one light source 110 to display a visual cue (by prominently displaying the given segment 214b) indicative of the activation of the given segment 214b. As illustrated in FIG. 4C, the interaction element 310 is depicted as having made contact with a given segment 212b of the virtual user interface 200, at which point the at least one processor 130 controls the at least one light source 110 to display a visual cue (by prominently displaying the given segment 212b) indicative of the activation of the given segment 212b.

Referring to FIGS. 5A-5C, illustrated are different depictions of the interaction element 310 interfacing with the virtual user interface 200, in accordance with embodiments of the present disclosure. In the illustrated examples, the interaction element 310 is a pointer of a user-interaction controller. As illustrated in FIG. 5A, the interaction element 310 approaches the virtual user interface 200, which remains uncluttered until interaction is imminent. As illustrated in FIG. 5B, the interaction element 310 is depicted as having made contact with a given segment 214b of the virtual user interface 200, at which point the at least one processor 130 controls the at least one light source 110 to display a visual cue (by prominently displaying the given segment 214b) indicative of the activation of the given segment 214b. As illustrated in FIG. 5C, the interaction element 310 is depicted as having made contact with a given segment 212b of the virtual user interface 200, at which point the at least one processor 130 controls the at least one light source 110 to display a visual cue (by prominently displaying the given segment 212b) indicative of the activation of the given segment 212b.

Referring to FIGS. 6A-6C, illustrated are different depictions of the virtual user interface 200 being digitally manipulated via the interaction element 310 in accordance with the visual effect associated with the activated given segment 214b, in accordance with embodiments of the present disclosure. In the illustrated examples, the interaction element 310 is a finger of a user. As illustrated in FIG. 6A, the interaction element 310 is positioned in proximity to the virtual user interface 200, ready to initiate interaction for activating the given segment 214b (of the virtual widget 200). As illustrated in FIG. 6B, the interaction element 310 activates the given segment 214b, configuring the at least one processor 130 to apply the visual cue indicative of this activation by displaying the given segment 214b. As illustrated in FIG. 6C, the interaction element 310 has moved, which corresponds to a change in the position of the virtual user interface 200, driven by a movement effect (as the visual effect), represented by reference numeral 600, associated with the given segment 214b. Herein, post-activation, the position of the interaction element 310 has changed, and this change is processed by the at least one processor 130 to digitally manipulate the virtual user interface 200 in accordance with the visual effect associated with the activated given segment 214b.

Referring to FIGS. 7A-7C, illustrated are different depictions of the virtual user interface 200 being digitally manipulated via the interaction element 310 in accordance with the visual effect associated with the activated given segment 214b, in accordance with embodiments of the present disclosure. In the illustrated examples, the interaction element 310 is a pointer of a user-interaction controller. As illustrated in FIG. 7A, the interaction element 310 is positioned in proximity to the virtual user interface 200, ready to initiate interaction for activating the given segment 214b (of the virtual widget 200). As illustrated in FIG. 7B, the interaction element 310 activates the given segment 214b, configuring the at least one processor 130 to apply the visual cue indicative of this activation by displaying the given segment 214b. As illustrated in FIG. 7C, the interaction element 310 has moved, which corresponds to a change in the position of the virtual user interface 200, driven by a movement effect (as the visual effect), represented by reference numeral 600, associated with the given segment 214b. Herein, post-activation, the position of the interaction element 310 has changed, and this change is processed by the at least one processor 130 to digitally manipulate the virtual user interface 200 in accordance with the visual effect associated with the activated given segment 214b.

Referring to FIGS. 8A-8C, illustrated are different depictions of the virtual user interface 200 being digitally manipulated via the interaction element 310 in accordance with the visual effect associated with the activated given segment 212b, in accordance with embodiments of the present disclosure. In the illustrated examples, the interaction element 310 is a finger of a user. As illustrated in FIG. 8A, the interaction element 310 is positioned in proximity to the virtual user interface 200, ready to initiate interaction for activating the given segment 212b (of the virtual widget 200). As illustrated in FIG. 8B, the interaction element 310 activates the given segment 212b, configuring the at least one processor 130 to apply the visual cue indicative of this activation by displaying the given segment 212b. As illustrated in FIG. 8C, the interaction element 310 has moved, which corresponds to a resizing of the virtual user interface 200, driven by a resizing effect (as the visual effect), represented by reference numeral 800, associated with the given segment 212b. Herein, post-activation, the position of the interaction element 310 has changed, and this change is processed by the at least one processor 130 to digitally manipulate the virtual user interface 200 in accordance with the visual effect associated with the activated given segment 212b.

Referring to FIGS. 9A-9C, illustrated are different depictions of the virtual user interface 200 being digitally manipulated via the interaction element 310 in accordance with the visual effect associated with the activated given segment 212b, in accordance with embodiments of the present disclosure. In the illustrated examples, the interaction element 310 is a pointer of a user-interaction controller. As illustrated in FIG. 9A, the interaction element 310 is positioned in proximity to the virtual user interface 200, ready to initiate interaction for activating the given segment 212b (of the virtual widget 200). As illustrated in FIG. 9B, the interaction element 310 activates the given segment 212b, configuring the at least one processor 130 to apply the visual cue indicative of this activation by displaying the given segment 212b. As illustrated in FIG. 9C, the interaction element 310 has moved, which corresponds to a resizing of the virtual user interface 200, driven by a resizing effect (as the visual effect), represented by reference numeral 900, associated with the given segment 212b. Herein, post-activation, the position of the interaction element 310 has changed, and this change is processed by the at least one processor 130 to digitally manipulate the virtual user interface 200 in accordance with the visual effect associated with the activated given segment 214b.

Figure 10A:
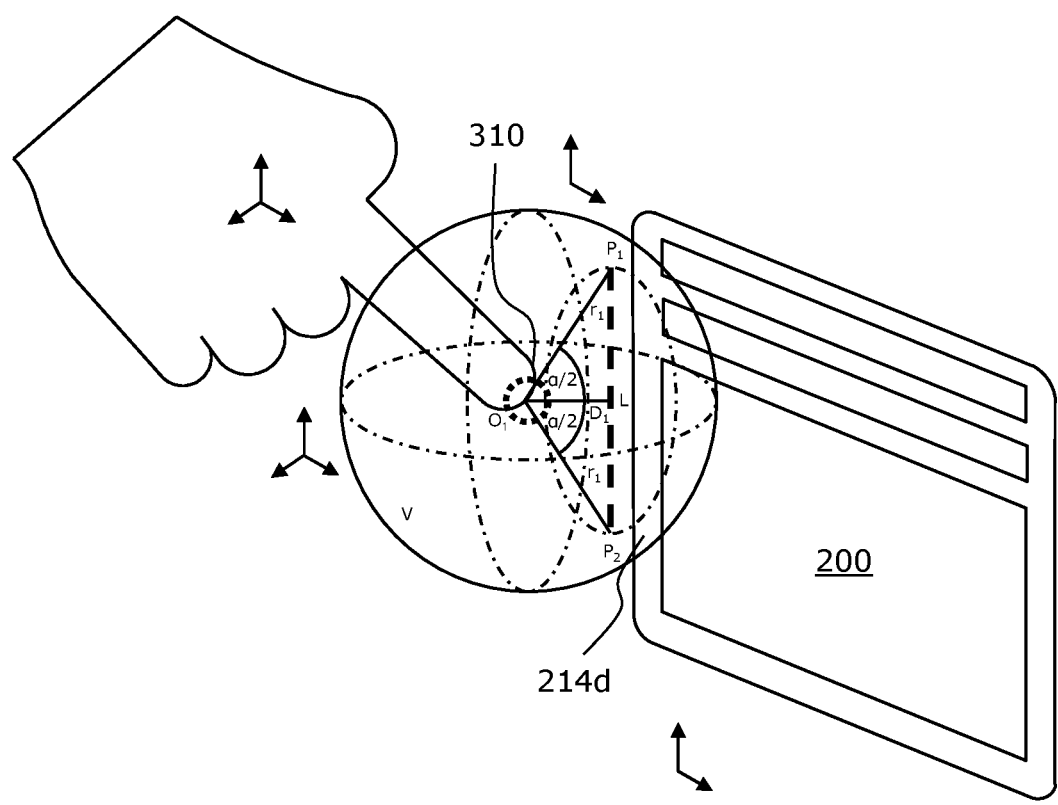
FIGS. 10A and 10B are illustrations for processing tracking data to determine whether the interaction element is in proximity to the given segment, when the interaction element is the finger of a user, in accordance with embodiments of the present disclosure.
Figure 10B:
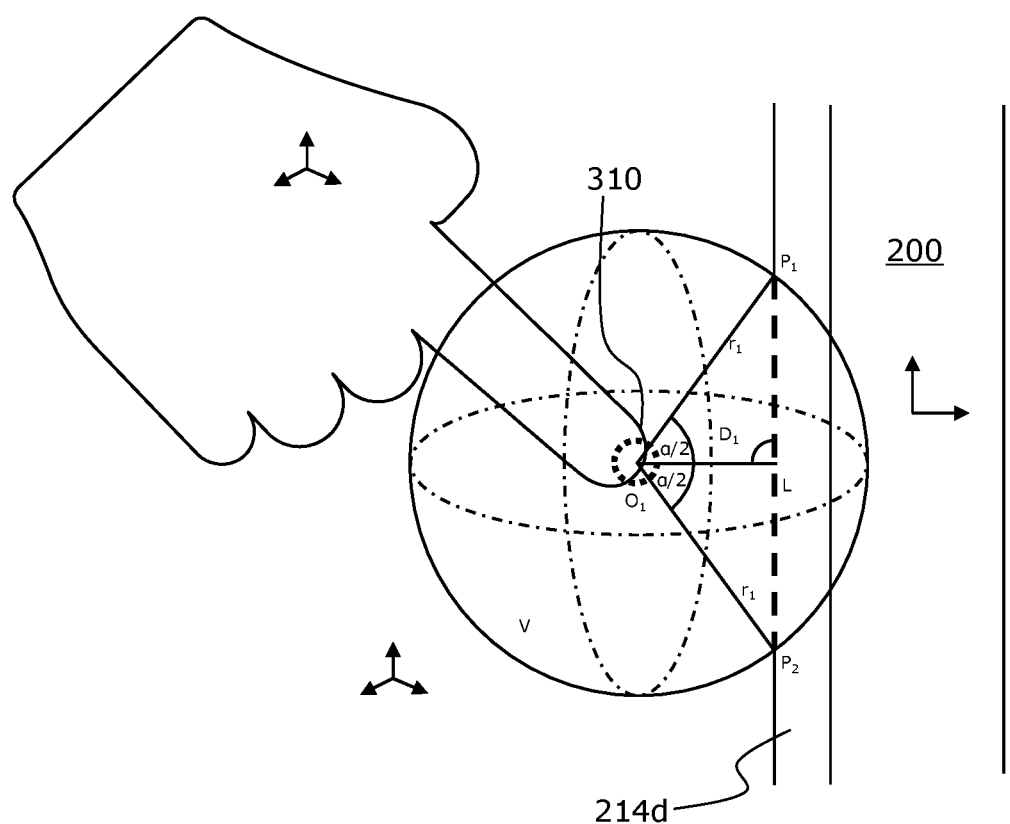

Referring to FIGS. 10A and 10B, illustrated are diagrams for processing the tracking data to determine whether the interaction element 310 is in proximity to the given segment 214d of the virtual widget 210, when the interaction element 310 is a finger of a user, in accordance with embodiments of the present disclosure. For this purpose, the at least one processor 130 is configured to define a first origin point '$O_1$' at a position of a tip of the finger, and an interaction volume 'V' around the first origin point '$O_1$'. When it is determined that the interaction volume 'V' intersects with the at least one segment 214d of the virtual widget 210, the at least one processor 130 is configured to identify a first point '$P_1$' and a second point '$P_2$' of said intersection.

Herein, a length 'L' of a line segment between the first point '$P_1$' and the second point '$P_2$' can be calculated using:

$$L = 2 \cdot r_1 \cdot \sin(\alpha/2)$$

where 'r' is a first radius, and 'α' is an angle formed between two radii from the first origin point '$O_1$' to the line segment (i.e., the first radius '$r_1$' between the first origin point '$O_1$' and the first point '$P_1$', and the first radius '$r_1$' between the first origin point '$O_1$' and the second point '$P_2$'). The interaction length of the given segment 214d of the virtual widget 210 is considered equal to length of the segment inside the interaction volume 'V'.

The at least one processor 130 is further configured to determine whether the first point '$P_1$' and the second point 'P₂' lie on two different segments of the virtual widget 210. When it is determined that the first point 'P₁' and the second point 'P₂' lie on the two different segments of the virtual widget 210, the at least one processor 130 is configured to determine interaction lengths (L₁ and L₂, as illustrated in FIG. 11) of the two different segments within the interaction volume 'V', and select the given segment as that segment amongst the two different segments whose interaction length L₁ or L₂ is higher than that of another segment amongst the two different segments. When it is determined that the first point 'P₁' and the second point 'P₂' do not lie on the two different segments of the virtual widget 210, the at least one processor 130 is configured to select the given segment as that segment on which both the first point 'P₁' and the second point 'P₂' lie (as illustrated in FIG. 12).

The at least one processor 130 is further configured to determine a first perpendicular distance 'D₁' from the first origin 'O₁' point to the given segment. The at least one processor 130 is further configured to determine whether the first perpendicular distance 'D₁' is less than or equal to a first predefined distance threshold, wherein it is determined that the finger (i.e., the interaction element 310) is in proximity to the given segment 214d of the virtual widget 210, when it is determined that the first perpendicular distance 'D₁' is less than or equal to the first predefined distance threshold.

Figure 13A:
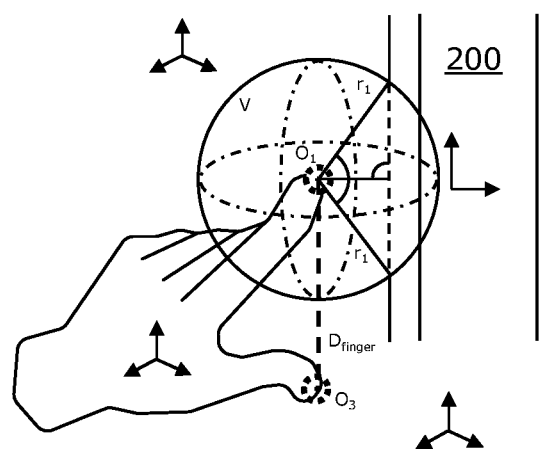
FIGS. 13A and 13B are illustrations for determining whether the given segment is activated when the interaction element is the finger of a user, in accordance with embodiments of the present disclosure.
Figure 13B:
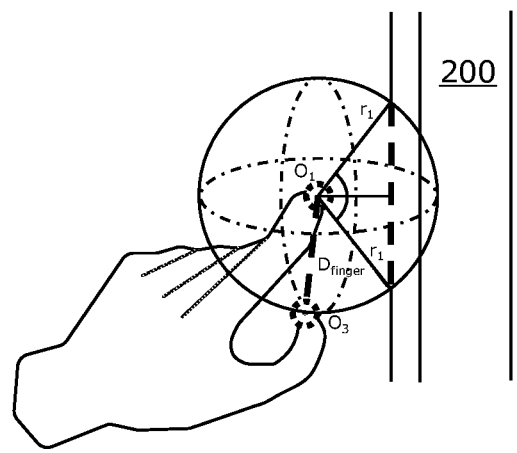

Referring to FIGS. 13A and 13B, illustrated are diagrams for determining whether the given segment 214d is activated when the interaction element 310 is a finger of a user, in accordance with embodiments of the present disclosure. As illustrated, when determining whether the given segment 214d is activated, the at least one processor 130 is configured to define a third origin point 'O₃' at a position of a tip of another finger of the user. The at least one processor 130 is further configured to determine a distance 'D_finger' between the first origin point 'O₁' and the third origin point 'O₃', wherein the given segment 214d is determined to be activated when said distance 'D_finger' is less than or equal to a second predefined distance threshold. In the present illustrations, the given segment 214d may not be activated in FIG. 13A as the distance 'D_finger' between the first origin point 'O₁' and the third origin point 'O₃' is greater than the second predefined distance threshold, while the given segment 214d may be activated in FIG. 13B as the distance 'D_finger' between the first origin point 'O₁' and the third origin point 'O₃' is less than or equal to the second predefined distance threshold.

Figure 14A:
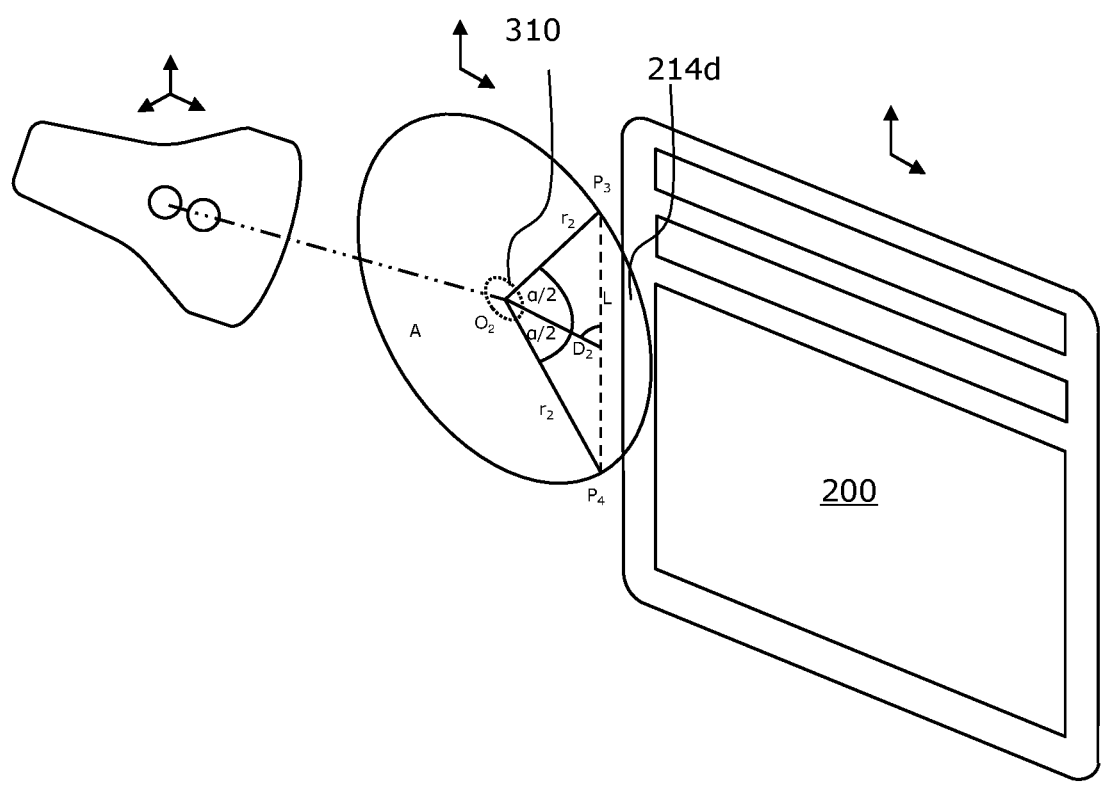
FIGS. 14A and 14B are illustrations for processing tracking data to determine whether the interaction element is in proximity to the given segment, when the interaction element is the pointer of the user-interaction controller, in accordance with embodiments of the present disclosure.
Figure 14B:
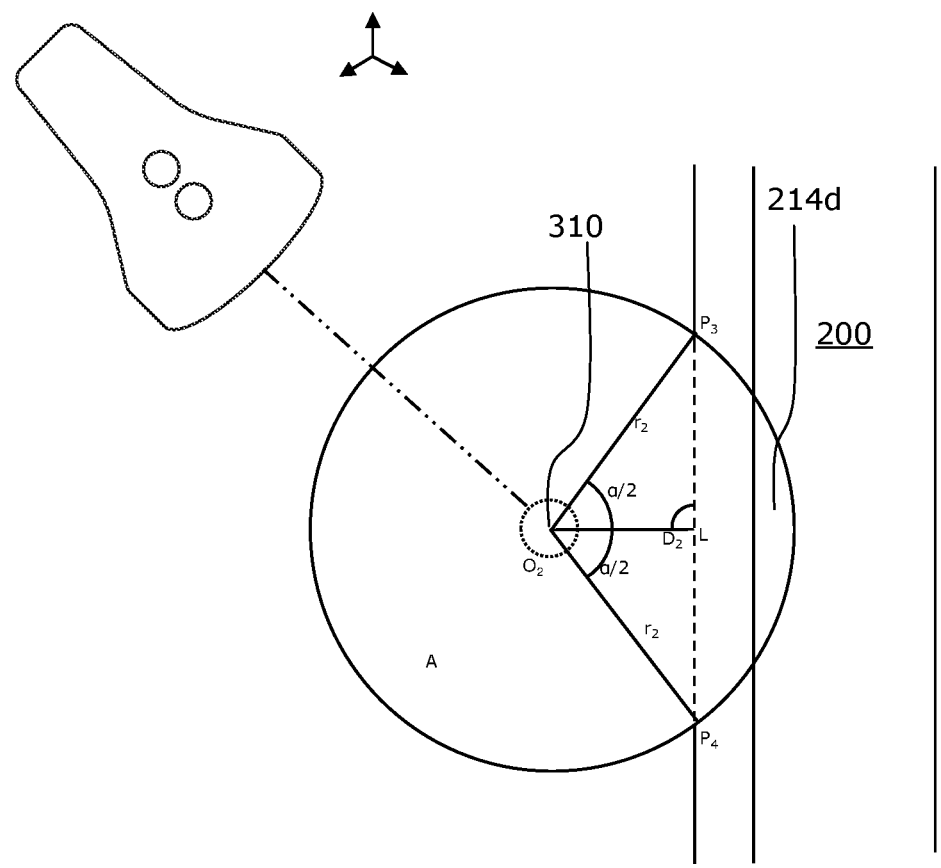

Referring to FIGS. 14A and 14B, illustrated are diagrams for processing the tracking data to determine whether the interaction element 310 is in proximity to the given segment 214d of the virtual widget 210, when the interaction element 310 is a pointer of a user-interaction controller, in accordance with embodiments of the present disclosure. For this purpose, the at least one processor 130 is configured to define a second origin point 'O₂' at a position of an intersection point of the pointer with a plane in which the virtual user interface 200 lies, and an interaction area 'A' around the second origin point 'O₂'. The at least one processor 130 is further configured to determine whether the interaction area 'A' intersects with at least one segment of the virtual widget 210. When it is determined that the interaction area 'A' intersects with the at least one segment of the virtual widget 210, the at least one processor 130 is configured to identify a third point 'P₃' and a fourth point 'P₄' of said intersection.

Herein, a length 'L' of the virtual widget 210 is then calculated using the two known side lengths (i.e., second radius 'r₂') and the angle 'α' they form, using the formula $L=2 \cdot r_2 \cdot \sin(\alpha/2)$, allowing for a geometrically defined display of the virtual widget 210.

The at least one processor 130 is further configured to determine whether the third point 'P₃' and the fourth point 'P₄' lie on two different segments of the virtual widget 210. When it is determined that the third point 'P₃' and the fourth point 'P₄' lie on the two different segments of the virtual widget 210, the at least one processor 130 is configured to determine interaction lengths of the two different segments within the interaction area, and select the given segment 214d as that segment amongst the two different segments whose interaction length is higher than that of another segment amongst the two different segments. When it is determined that the third point 'P₃' and the fourth point 'P₄' do not lie on the two different segments of the virtual widget 210, the at least one processor 130 is configured to select the given segment 214d as that segment on which both the third point 'P₃' and the fourth point 'P₄' lie.

The at least one processor 130 is further configured to determine a second perpendicular distance 'D₂' from the second origin point 'O₂' to the given segment 214d. The at least one processor 130 is further configured to determine whether the second perpendicular distance 'D₂' is less than or equal to a first predefined distance threshold, wherein it is determined that the pointer is in proximity to the given segment 214d of the virtual widget 210, when it is determined that the second perpendicular distance 'D₂' is less than or equal to the first predefined distance threshold.

Figure 15A:
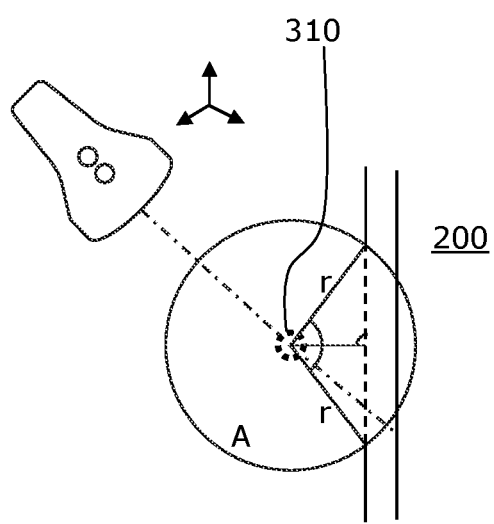
FIGS. 15A and 15B are illustrations for determining whether the given segment is activated when the interaction element is pointer of the user-interaction controller, in accordance with embodiments of the present disclosure.
Figure 15B:
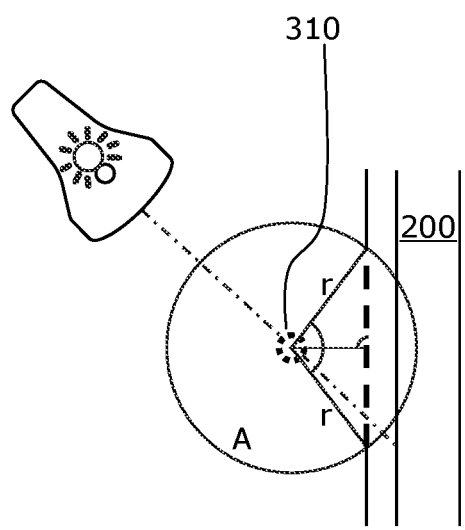

Referring to FIGS. 15A and 15B, illustrated are diagrams for determining whether the given segment 214d is activated when the interaction element 310 is a pointer of a user-interaction controller, in accordance with embodiments of the present disclosure. Herein, when determining whether the given segment 214d is activated, the at least one processor 130 is configured to receive, from the user-interaction controller 310, a user input provided by a user. The at least one processor 130 is further configured to process the user input to determine whether the user input is indicative of activation of the given segment 214d. As illustrated in FIG. 15A, the user-interaction controller is shown in a neutral position with respect to the virtual user interface 200, ready to receive user input. As illustrated in FIG. 15A, the user-interaction controller is moved (tilted), indicative of the user providing input by pressing and holding a defined button or trigger. This action, as captured by the at least one processor 130, is processed to determine whether the user input is demonstrative of the user's intent to activate the virtual widget 210 associated with the given segment 214d.

Figure 16:
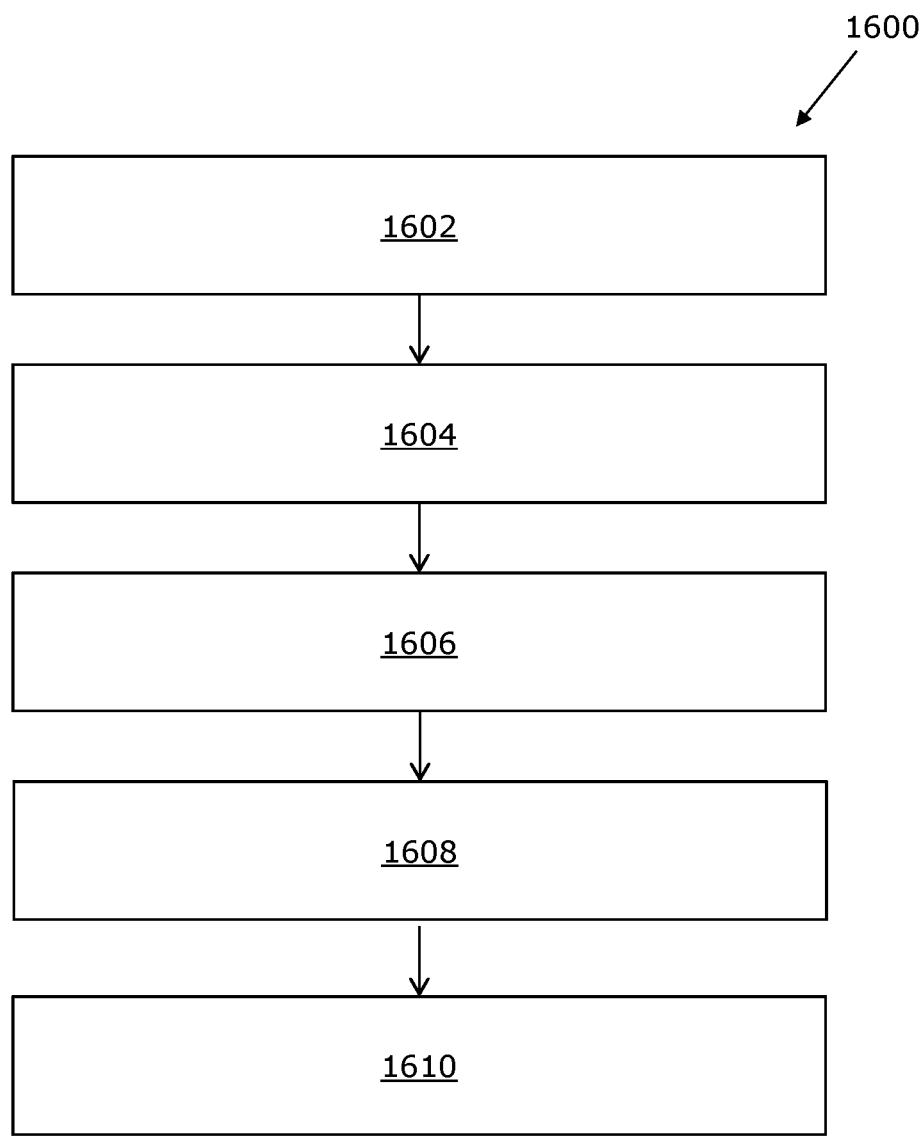
FIG. 16 illustrates steps of a method for digital manipulation of the virtual user interface, in accordance with embodiments of the present disclosure.

Referring to FIG. 16, illustrated is a flowchart listing steps involved in a method 1600 for digital manipulation of a virtual user interface, in accordance with embodiments of the present disclosure. The method 1600 is implemented by the display apparatus 100. At step 1602, the method 1600 includes controlling at least one light source to display the virtual user interface in a three-dimensional space. At step 1604, the method 1600 includes processing tracking data, collected by at least one tracking means, to determine whether an interaction element is in proximity to a given segment of a virtual widget that is invisible in the three-dimensional space, wherein the virtual widget comprises at least a virtual border of the virtual user interface. At step 1606, the method 1600 includes, when it is determined that the interaction element is in proximity to the given segment of the virtual widget, controlling the at least one light source to display the given segment in the three-dimensional space. At step 1608, the method 1600 includes determining whether the given segment is activated. At step 1610, the method 1600 includes, when it is determined that the given segment is activated, processing the tracking data to determine a change in the position of the interaction element upon said activation and digitally manipulate the virtual user interface according to a visual effect associated with the given segment and the change in the position of the interaction element.

The aforementioned steps are only illustrative, and other alternatives can also be provided where one or more steps are added, one or more steps are removed, or one or more steps are provided in a different sequence without departing from the scope of the claims herein.

The invention claimed is:

1. A display apparatus comprising:
   at least one light source;
   at least one tracking means; and
   at least one processor configured to:
   control the at least one light source to display a virtual user interface (200) in a three-dimensional space;
   process tracking data, collected by the at least one tracking means, to determine whether an interaction element is in proximity to a given segment of a virtual widget that is invisible in the three-dimensional space, wherein the virtual widget comprises at least a virtual border of the virtual user interface;
   when it is determined that the interaction element is in proximity to the given segment of the virtual widget, control the at least one light source to display the given segment in the three-dimensional space;
   determine whether the given segment is activated;
   when it is determined that the given segment is activated, process the tracking data to determine a change in the position of the interaction element upon said activation and digitally manipulate the virtual user interface according to a visual effect associated with the given segment and the change in the position of the interaction element;
   wherein the interaction element is a finger of a user, and wherein when processing the tracking data to determine whether the interaction element is in proximity to the given segment of the virtual widget, the at least one processor is configured to:
   define a first origin point at a position of a tip of the finger, and an interaction volume around the first origin point;
   determine whether the interaction volume intersects with at least one segment of the virtual widget;
   when it is determined that the interaction volume intersects with the at least one segment of the virtual widget, identify a first point and a second point of said intersection;
   determine whether the first point and the second point lie on two different segments of the virtual widget,
   when it is determined that the first point and the second point lie on the two different segments of the virtual widget, determine interaction lengths of the two different segments within the interaction volume, and select the given segment as that segment amongst the two different segments whose interaction length is higher than that of another segment amongst the two different segments;
   when it is determined that the first point and the second point do not lie on the two different segments of the virtual widget, select the given segment as that segment on which both the first point and the second point lie;
   determine a first perpendicular distance from the first origin point to the given segment; and
   determine whether the first perpendicular distance is less than or equal to a first predefined distance threshold, wherein it is determined that the finger is in proximity to the given segment of the virtual widget, when it is determined that the first perpendicular distance is less than or equal to the first predefined distance threshold.

2. The display apparatus of claim 1, wherein when determining whether the given segment is activated, the at least one processor is configured to:
   define a third origin point at a position of a tip of another finger of the user;
   determine a distance between the first origin point and the third origin point, wherein the given segment is determined to be activated when said distance is less than or equal to a second predefined distance threshold.

3. The display apparatus of claim 1, wherein the interaction element is a pointer of a user-interaction controller, and wherein when processing the tracking data to determine whether the interaction element is in proximity to the given segment of the virtual widget, the at least one processor is configured to:
   define a second origin point at a position of an intersection point of the pointer with a plane in which the virtual user interface lies, and an interaction area around the second origin point;
   determine whether the interaction area intersects with at least one segment of the virtual widget;
   when it is determined that the interaction area intersects with the at least one segment of the virtual widget, identify a third point and a fourth point of said intersection;
   determine whether the third point and the fourth point lie on two different segments of the virtual widget,
   when it is determined that the third point and the fourth point lie on the two different segments of the virtual widget, determine interaction lengths of the two different segments within the interaction area, and select the given segment as that segment amongst the two different segments whose interaction length is higher than that of another segment amongst the two different segments;
   when it is determined that the third point and the fourth point do not lie on the two different segments of the virtual widget, select the given segment as that segment on which both the third point and the fourth point lie;
   determine a second perpendicular distance from the second origin point to the given segment; and
   determine whether the second perpendicular distance is less than or equal to a first predefined distance threshold, wherein it is determined that the pointer is in proximity to the given segment of the virtual widget, when it is determined that the second perpendicular distance is less than or equal to the first predefined distance threshold.

4. The display apparatus of claim 3, wherein when determining whether the given segment is activated, the at least one processor is configured to:
   receive, from the user-interaction controller, a user input provided by a user; and
   process the user input to determine whether the user input is indicative of activation of the given segment.

5. The display apparatus of claim 1, wherein when it is determined that the given segment is activated, the at least one processor is further configured to control the at least one light source to display a visual cue indicative of said activation, in the three-dimensional space, wherein upon displaying of the visual cue, the position of the interaction element is changeable for digitally manipulating the virtual user interface according to the visual effect associated with the given segment.

6. The display apparatus of claim 1, wherein the visual effect associated with the given segment of the virtual widget comprises one of: a resizing effect, a movement effect.

7. The display apparatus of claim 1, wherein the virtual widget is divided into a plurality of segments such that at least one first segment amongst the plurality of segments is associated with a different visual effect than at least one second segment amongst the plurality of segments.

8. The display apparatus of claim 7, wherein the plurality of segments comprise eight segments such that four first segments amongst the eight segments are arranged at four corners of the virtual user interface, and four second segments amongst the eight segments are arranged at four sides of the virtual user interface.

9. The display apparatus of claim 7, wherein a length of each segment amongst the plurality of segments depends on:
dimensions of the virtual user interface; and
dimension that is to be used for defining an interaction volume or an interaction area of the interaction element when processing the tracking data to determine whether the interaction element is in proximity to the given segment of the virtual widget.

10. A method for digital manipulation of a virtual user interface, the method comprising:
controlling at least one light source to display the virtual user interface in a three-dimensional space;
processing tracking data, collected by at least one tracking means, to determine whether an interaction element is in proximity to a given segment of a virtual widget that is invisible in the three-dimensional space, wherein the virtual widget comprises at least a virtual border of the virtual user interface;
when it is determined that the interaction element is in proximity to the given segment of the virtual widget, controlling the at least one light source to display the given segment in the three-dimensional space;
determining whether the given segment is activated; and
when it is determined that the given segment is activated, processing the tracking data to determine a change in the position of the interaction element upon said activation and digitally manipulate the virtual user interface according to a visual effect associated with the given segment and the change in the position of the interaction element;
wherein the interaction element is a finger of a user, and wherein for processing the tracking data to determine whether the interaction element is in proximity to the given segment of the virtual widget, the method further comprises:
defining a first origin point at a position of a tip of the finger, and an interaction volume around the first origin point;
determining whether the interaction volume intersects with at least one segment of the virtual widget;
when it is determined that the interaction volume intersects with the at least one segment of the virtual widget, identifying a first point and a second point of said intersection;
determining whether the first point and the second point lie on two different segments of the virtual widget,
when it is determined that the first point and the second point lie on the two different segments of the virtual widget, determining interaction lengths of the two different segments within the interaction volume, and select the given segment as that segment amongst the two different segments whose interaction length is higher than that of another segment amongst the two different segments;
when it is determined that the first point and the second point do not lie on the two different segments of the virtual widget, selecting the given segment as that segment on which both the first point and the second point lie;
determining a first perpendicular distance from the first origin point to the given segment; and
determining whether the first perpendicular distance is less than or equal to a first predefined distance threshold, wherein it is determined that the finger is in proximity to the given segment of the virtual widget, when it is determined that the first perpendicular distance is less than or equal to the first predefined distance threshold.

11. The method of claim 10, wherein when determining whether the given segment is activated, the method further comprises:
defining a third origin point at a position of a tip of another finger of the user;
determining a distance between the first origin point and the third origin point, wherein the given segment is determined to be activated when said distance is less than or equal to a second predefined distance threshold, the second predefined distance being equal to the first radius.

12. The method of claim 10, wherein the interaction element is a pointer of a user-interaction controller, and wherein for processing the tracking data to determine whether the interaction element is in proximity to the given segment of the virtual widget, the method further comprises:
defining a second origin point at a position of an intersection point of the pointer with a plane in which the virtual user interface lies, and an interaction area around the second origin point;
determining whether the interaction area intersects with at least one segment of the virtual widget;
when it is determined that the interaction area intersects with the at least one segment of the virtual widget, identifying a third point and a fourth point of said intersection;
determining whether the third point and the fourth point lie on two different segments of the virtual widget,
when it is determined that the third point and the fourth point lie on the two different segments of the virtual widget, determining interaction lengths of the two different segments within the interaction volume, and select the given segment as that segment amongst the two different segments whose interaction length is higher than that of another segment amongst the two different segments;
when it is determined that the third point and the fourth point do not lie on the two different segments of the virtual widget, selecting the given segment as that segment on which both the third point and the fourth point lie;
determining a second perpendicular distance from the second origin point to the given segment; and
determining whether the second perpendicular distance is less than or equal to a first predefined distance threshold, wherein it is determined that the pointer is in proximity to the given segment of the virtual widget, when it is determined that the second perpendicular distance is less than or equal to the first predefined distance threshold.

13. The method of claim 12, wherein when determining whether the given segment is activated, the method further comprises:
   receiving, from the user-interaction controller, a user input provided by a user; and
   processing the user input to determine whether the user input is indicative of activation of the given segment.

* * * * *